US011777951B2

(12) United States Patent
Casey et al.

(10) Patent No.: US 11,777,951 B2
(45) Date of Patent: *Oct. 3, 2023

(54) DATA AND SOURCE VALIDATION FOR EQUIPMENT OUTPUT DATA OR EQUIPMENT FAILURE PREDICTION USING BLOCKCHAINS

(71) Applicant: CenturyLink Intellectual Property LLC, Broomfield, CO (US)

(72) Inventors: Steven M. Casey, Littleton, CO (US); Kevin M. McBride, Lone Tree, CO (US); William O'Brien, Jr., Aurora, CO (US); Stephen Opferman, Denver, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/517,334

(22) Filed: Nov. 2, 2021

(65) Prior Publication Data
US 2022/0060483 A1    Feb. 24, 2022

Related U.S. Application Data

(63) Continuation of application No. 16/774,974, filed on Jan. 28, 2020, now Pat. No. 11,178,157.
(Continued)

(51) Int. Cl.
*H04L 9/40* (2022.01)
*G06F 16/27* (2019.01)
(Continued)

(52) U.S. Cl.
CPC .............. *H04L 63/12* (2013.01); *G06F 16/27* (2019.01); *G06F 21/44* (2013.01); *G06F 21/64* (2013.01);
(Continued)

(58) Field of Classification Search
CPC ..... H04L 63/12; H04L 9/0643; H04L 9/3236; H04L 61/4511; H04L 63/126;
(Continued)

(56) References Cited

U.S. PATENT DOCUMENTS 11,010,233 B1    5/2021  Golden
2006/0234675 A1*  10/2006  Flavin .................... H04L 12/14
                                                         455/410
(Continued)

*Primary Examiner* — Cheng-Feng Huang

(57) ABSTRACT

Novel tools and techniques are provided for implementing data and source validation for equipment output data and/or for equipment failure predict. In various embodiments, in response to receiving a first request for first data that is output by first equipment, a computing system might retrieve and analyze the first data to determine whether the first data can be trusted. If so, the computing system might send the first data to the requesting device. If not, the computing system might send a second request for identifying a blockchain containing a block containing a copy of the first data. In response to the blockchain system identifying such a blockchain, the computing system might receive the identified blockchain; might abstract the block containing the copy of the first data from the identified blockchain; might abstract the first data from the block; and might send the first data to the requesting device.

14 Claims, 13 Drawing Sheets

Related U.S. Application Data

(60) Provisional application No. 62/957,065, filed on Jan. 3, 2020, provisional application No. 62/818,539, filed on Mar. 14, 2019, provisional application No. 62/801,235, filed on Feb. 5, 2019.

(51) Int. Cl.

| | |
|---|---|
| *H04L 9/06* | (2006.01) |
| *H04L 9/32* | (2006.01) |
| *H04L 61/4511* | (2022.01) |
| *H04L 67/568* | (2022.01) |
| *G06F 21/44* | (2013.01) |
| *G06F 21/64* | (2013.01) |
| *G06F 16/23* | (2019.01) |
| *H04L 9/00* | (2022.01) |

(52) U.S. Cl.
CPC .......... *H04L 9/0643* (2013.01); *H04L 9/3236* (2013.01); *H04L 61/4511* (2022.05); *H04L 63/126* (2013.01); *H04L 63/1466* (2013.01); *H04L 67/568* (2022.05); *G06F 16/2379* (2019.01); *H04L 9/50* (2022.05)

(58) Field of Classification Search
CPC ..... H04L 63/1466; H04L 67/568; H04L 9/50; H04L 41/0895; H04L 41/149; H04L 41/40; H04L 41/0213; H04L 41/085; H04L 41/147; H04L 41/16; H04L 9/3239; G06F 16/27; G06F 16/2379; G06F 21/44; G06F 21/64; G06Q 10/20; G16Y 40/35
See application file for complete search history.

(56) References Cited

U.S. PATENT DOCUMENTS

| | | |
|---|---|---|
| 2015/0195190 A1 | 7/2015 | Shahram |
| 2015/0195192 A1 | 7/2015 | Vasseur |
| 2017/0344411 A1* | 11/2017 | Lee .................... G05B 23/0294 |
| 2018/0190147 A1 | 7/2018 | Chapela |
| 2019/0097873 A1 | 3/2019 | Nucci |
| 2019/0158270 A1 | 5/2019 | Berti |
| 2019/0207957 A1 | 7/2019 | Espinosa |
| 2019/0228429 A1* | 7/2019 | Mottur .................. H04L 9/3236 |
| 2020/0118120 A1* | 4/2020 | Hing .................... H04L 9/3239 |
| 2020/0252410 A1 | 8/2020 | Casey |

* cited by examiner

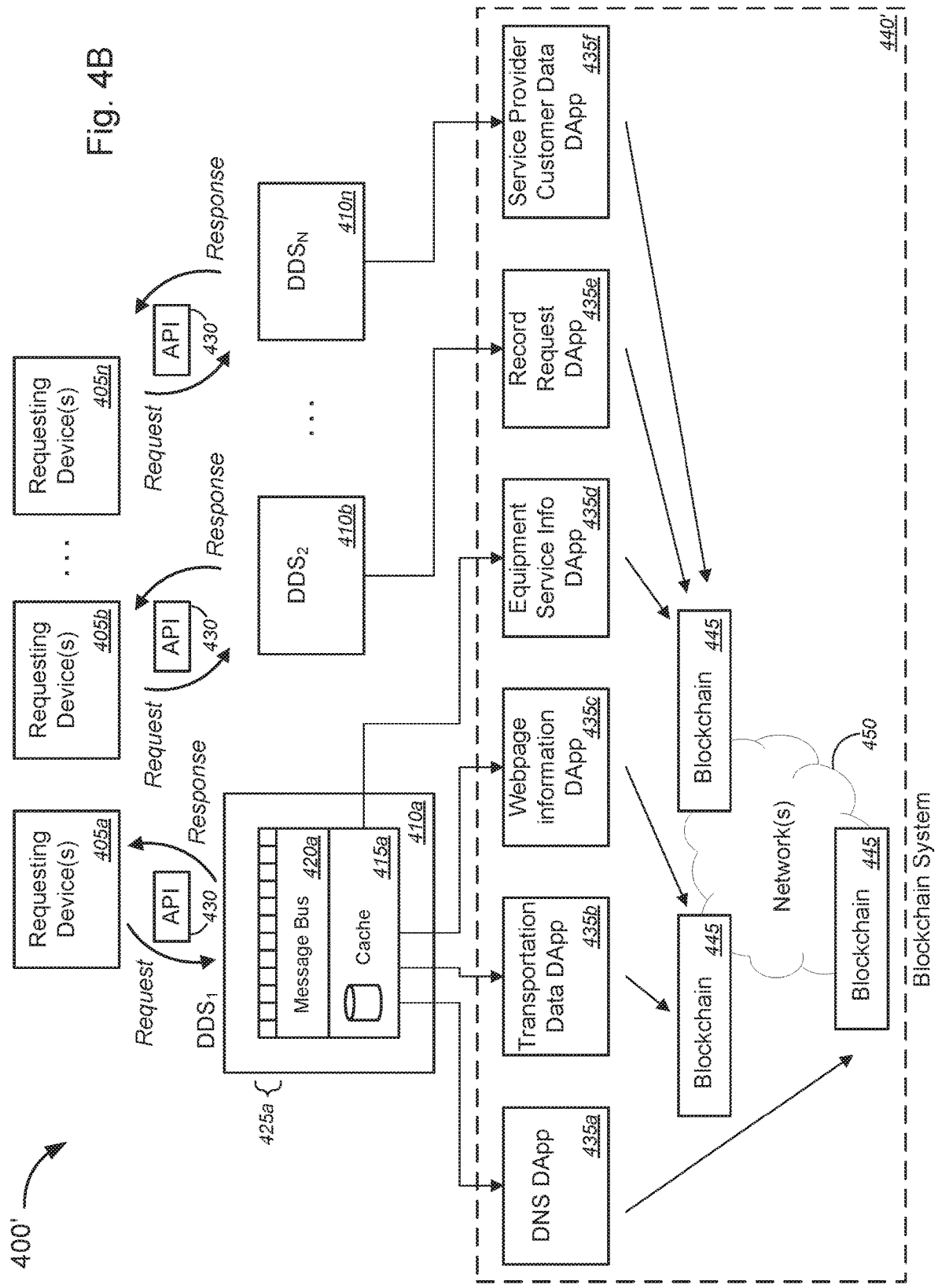

600

800

DATA AND SOURCE VALIDATION FOR EQUIPMENT OUTPUT DATA OR EQUIPMENT FAILURE PREDICTION USING BLOCKCHAINS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing equipment output data validation or equipment failure prediction, and, more particularly, to methods, systems, and apparatuses for utilizing blockchains to implement data and source validation for equipment output data and/or for equipment failure prediction. The present disclosure also relates, in general, to methods, systems, and apparatuses for implementing tracking or storing of equipment configuration data, and, more particularly, to methods, systems, and apparatuses for utilizing the immutable ledger functionality of blockchains to track and/or store equipment configuration data.

BACKGROUND

In conventional systems, information or data from devices or from logging or record systems might be received by data dissemination systems or data collection systems. Such information or data, however, may be susceptible to interception by nefarious parties and/or spoofing by such parties, thus resulting in information or data that is unreliable or untrustworthy, especially where such information or data may be relied upon for predicting equipment failure.

In other conventional systems, configuration data that may be used to configure operation of equipment, when sent from the equipment to a data storage device or other device, may be intercepted or accessed and may be changed without authorization or by accident. In some cases, when equipment failure or communication failure by the equipment occurs, being able to trust records of the equipment's configuration data is important, yet the configuration data of conventional systems may be susceptible to changes or falsification.

Hence, there is a need for more robust and scalable solutions for implementing equipment output data validation or equipment failure prediction, and, more particularly, to methods, systems, and apparatuses for utilizing blockchains to implement data and source validation for equipment output data and/or for equipment failure predict. There is also a need for more robust and scalable solutions for implementing tracking or storing of equipment configuration data, and, more particularly, to methods, systems, and apparatuses for utilizing the immutable ledger functionality of blockchains to track and/or store equipment configuration data.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A and 4B are schematic diagrams illustrating various embodiments for yet another system for utilizing blockchains to implement data and source validation for equipment output data and/or for equipment failure prediction, in accordance with various embodiments.

DETAILED DESCRIPTION OF CERTAIN EMBODIMENTS

Overview

Figure 1:
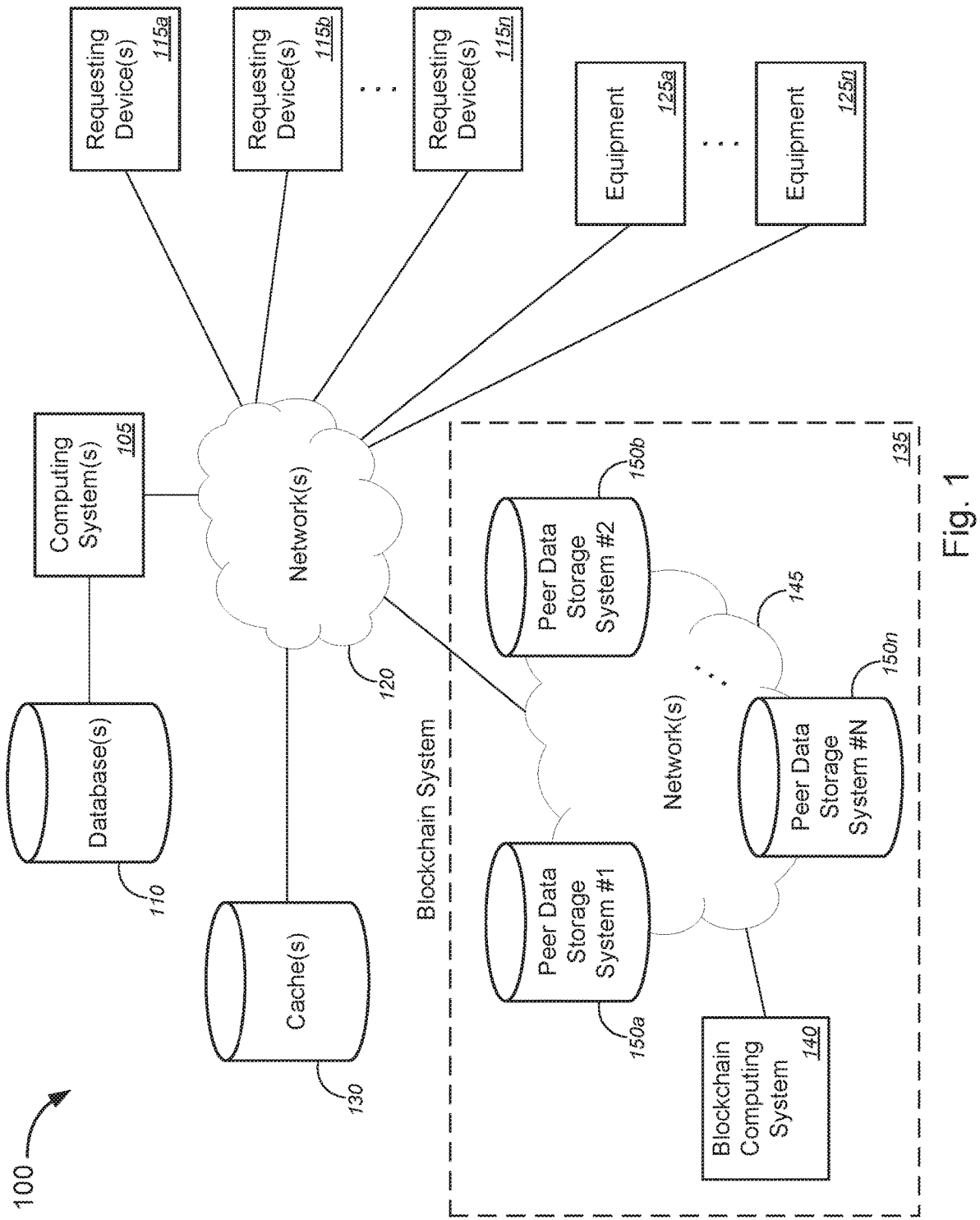
FIG. 1 is a schematic diagram illustrating a system for utilizing blockchains to implement data and source validation for equipment output data and/or for equipment failure prediction, in accordance with various embodiments.

Various embodiments provide tools and techniques for implementing equipment output data validation or equipment failure prediction, and, more particularly, to methods, systems, and apparatuses for utilizing blockchains to implement data and source validation for equipment output data and/or for equipment failure predict. The various embodiments also provide tools and techniques for implementing tracking or storing of equipment configuration data, and, more particularly, to methods, systems, and apparatuses for utilizing the immutable ledger functionality of blockchains to track and/or store equipment configuration data.

In various embodiments, a computing system might receive a first request for data that is output by first equipment from a user via a requesting device, and might determine whether a cache that is communicatively coupled to the computing system contains data that is responsive to the received first request (e.g., data that is output by first equipment, or the like). In some embodiments, the computing system might also determine whether such data that is responsive to the received first request (i.e., data that is output by the first equipment, etc.) can be trusted. Based on a determination that the cache contains data that is responsive to the received first request and based on a determination that such data (which includes data as output by first equipment) can be trusted, the computing system might retrieve the data that is responsive to the received first request, and might send the retrieved data to the requesting device. On the other hand, based on a determination that the cache does not contain data that is responsive to the received first request and/or based on a determination that data that is stored in the cache(s) and that is responsive to the received first request cannot be trusted, the computing system might send, to a blockchain system, a second request for identifying a blockchain containing a block containing data responsive to the received first request, by identifying a blockchain containing a block containing a copy of the first data that is output by the first equipment.

In response to the blockchain system identifying a blockchain containing a block containing data responsive to the received first request, the computing system (or a blockchain computing system) might receive a copy of the identified blockchain from the blockchain system; might abstract, from the identified blockchain, the block containing the data responsive to the received first request (i.e., the copy of the data that is output by the first equipment, in this case); might abstract, from the identified block, the data responsive to the received first request (i.e., the copy of the data that is output by the first equipment, in this case); and might send the data (i.e., the data that is output by the first equipment) to the requesting device.

In some embodiments, the computing system might each include, without limitation, one of a data collection system, a real-time processing system, an artificial intelligence ("AI") system, a server computer, a cloud-based computing system over a network, or a distributed computing system, and/or the like. In some cases, the requesting device might include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, where the first equipment might include, without limitation, one of an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual network device, a virtual router, a server, or a virtual customer interaction data collection system, and/or the like.

In some aspects, the computing system and/or the blockchain system might analyze the first data by performing at least one of data validation and/or source validation on the first data. In some cases, the first data might comprise source identification information, where performing source validation on the first data might comprise validating the source identification information contained in the first data. In some embodiments, the computing system and/or the blockchain system might perform at least one of data validation and/or source validation using a combination of two or more of a real-time processing system, an intelligence system, an intelligence algorithms, and a support systems (which might include, without limitation, business, operations, or development systems, etc.), and/or the like. Data and/or source validation may, in some embodiments, also be performed at cache(s). In some instances, analyzing the first data might comprise analyzing, with the computing system and/or the blockchain system, the first data in real-time or near-real-time.

Merely by way of example, in some instances, the determination that the first data as output by the first equipment being deemed to be trusted data might be based on a determination that the first data as output by the first equipment is within a predetermined range of threshold values or parameters, where the determination that the first data is deemed to require further data validation might be based on a determination that the first data exceeds the predetermined range of threshold values or parameters.

According to some embodiments, the computing system might analyze the first data to predict equipment failure of the first equipment, based on analysis of the first data, where the first data might include, without limitation, at least one of a status of the first equipment, a change in status of the first equipment, or one or more alerts output by the first equipment, and/or the like. In some cases, the first data might further include, but is not limited to, at least one of a source identifier, a date and time stamp associated with each of at least one of the status of the first equipment, the change in status of the first equipment, or the one or more alerts output by the first equipment, and/or the like.

In some embodiments, the first data might include, without limitation, at least one of one or more portions of a log of interactions between a user and a service provider, data communicated by third party service provider systems, data communicated by public service systems, or public data, and/or the like. In such cases, the interactions between the user and the service provider might include, but is not limited to, at least one of online chats, text messages, telephone conversations, e-mail communications, software application usage, or service provider website interaction by the user, and/or the like. In some instances, the public data might include, without limitation, at least one of weather data, stock data, news data, or street traffic data, and/or the like.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system and to the blockchain system, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

In various other embodiments, a computing system might receive, from a requesting device, a first request for first configuration data that is output by first equipment, the first configuration data being used to configure operation of the first equipment. The computing system might determine whether data repository that is communicatively coupled to the computing system (in this case, via a network(s), or the like) contains the first configuration data that is responsive to the received first request. Based on a determination that the data repository contains the first configuration data that is responsive to the received first request, the computing system might retrieve the first configuration data that is responsive to the received first request, and might send the retrieved first configuration data to the requesting device. Based on a determination that the data repository does not contain the first configuration data that is responsive to the received first request, the computing system might send, to blockchain system, a second request for identifying a blockchain containing a block containing the first configuration data responsive to the received first request.

In response to the blockchain system identifying a blockchain containing a block containing the first configuration data responsive to the received first request, the computing system might: receive a copy of the identified blockchain from the blockchain system; abstract, from the identified blockchain, the block containing the first configuration data responsive to the received first request; abstract, from the identified block, the first configuration data responsive to the received first request; and send the first configuration data to the requesting device.

According to some embodiments, the first configuration data might comprise second configuration data including, but not limited to, at least one of basic input/output system ("BIOS") configuration data, storage configuration data, specialty card configuration data, security configuration data, operating system ("OS") configuration data, device driver configuration data, firmware configuration data, programming language translation configuration data, system utility configuration data, network configuration data, router configuration data, host configuration data, software configuration data, power configuration data, extensible firmware interface ("EFI") configuration data, or EFI system partition ("ESP") configuration data, and/or the like.

In some embodiments, the first configuration data might further comprise third configuration data including, without limitation, at least one of information regarding who created the second configuration data, information regarding who updated the second configuration data, information regarding who changed the second configuration data, information regarding who has accessed the second configuration data, information regarding requesting devices, information regarding when the second configuration data was created, information regarding when the second configuration data was updated, information regarding when the second configuration data was changed, information regarding when the second configuration data was accessed, or geospatial data of requesting devices, and/or the like. In some instances, the first configuration data might further comprise a unique identifier ("UID") associated with one of the first equipment or the first configuration data.

According to some embodiments, the first equipment might send fourth configuration data to blockchain system (in some cases, as beacon data or the like) either periodically or in response to at least one of the fourth configuration data being created, the fourth configuration data being updated, the fourth configuration data being changed, the first equipment being configured with the fourth configuration data, configuration of the first equipment being modified using the fourth configuration data, or configuration of the first equipment being changed using the fourth configuration data. The blockchain system might generate a block of a blockchain by incorporating the fourth configuration data into the block and might validate the generated block. The blockchain containing the generated block may be stored in data repository. In some embodiments, the fourth configuration data might be similar to the first configuration data.

The various embodiments described herein utilize the functionalities, advantages, and features of blockchain systems to make such information or data more secure and more transparently reliable due to the inherent validation capabilities of blockchain ledgers or the like, and the inherent capabilities of blockchain systems to clearly prevent covert replacement or modification of information contained in the blocks of the blockchain. The various embodiments might also utilize the blockchain system to perform data and/or source validation on data from equipment, where such data, once validated, might be used for performing equipment failure prediction.

The various embodiments described herein further utilize the functionalities, advantages, and features of blockchain systems to make secure configuration data that may be used to configure operation of equipment. The various embodiments provide a more secure computing infrastructure using mechanics from verifiable ledger-type validation, signing, or trust, etc., with machine configuration details where machines (including, but not limited to, servers, switches, IoT devices, or the like) act more like a set-top box ("STB") to actually request their configuration from a central server. In some examples, a centralized server (e.g., centralized Redfish server, or the like) would deprecate use of insecure systems (e.g., intelligent platform management interface ("IPMI"), or the like) while using a more STB-like check-in with a Redfish-type deployment to a server or switch with information on where to secure boot (e.g., using pre-boot execution environment ("PXE") or the like) from an image to come online or to become part of a compute infrastructure with a current configuration making it ready for discovery and service before being re-imaged by changes in the centralized server where customer attributes may be updated when the resource is consumed and needs new configuration applied (like BIOS configuration or storage controller configuration on a server, or the like).

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, named data system technologies, data logging technologies, data request and retrieval technologies, data collection systems, and/or the like. In other aspects, certain embodiments, can improve the functioning of user equipment or systems themselves (e.g., named data systems, data logging systems, data request and retrieval systems, data collection systems, etc.), for example, by receiving, with a computing system and from a requesting device, a first request for first data that is output by first equipment; in response to receiving the first request for the first data, retrieving, with the computing system, the first data that is output by the first equipment; analyzing, with the computing system, the first data to determine whether the first data as output by the first equipment can be trusted; based on a determination that the first data as output by the first equipment is deemed to be trusted data, sending, with the computing system, the first data to the requesting device; based on a determination that the first data is deemed to require further data validation, sending, with the computing system and to a blockchain system, a second request for identifying a blockchain containing a block containing a copy of the first data that is output by the first equipment; and in response to the blockchain system identifying the blockchain containing a copy of the first data that is output by the first equipment, performing the following: receiving, with the computing system, a copy of the identified blockchain from the blockchain system; abstracting, with the computing system and from the identified blockchain, the block containing the copy of the first data; abstracting, with the computing system and from the block, the copy of the first data that is output by the first equipment; and sending, with the computing system, the first data to the requesting device; and/or the like.

In particular, to the extent any abstract concepts are present in the various embodiments, those concepts can be implemented as described herein by devices, software, systems, and methods that involve specific novel functionality (e.g., steps or operations), such as, utilizing the functionalities, advantages, and features of blockchain systems to make information or data that is output from equipment (e.g., at least one of the one or more optical equipment, the one or more routers, the one or more servers, the one or more VMs, the one or more customer interaction systems, or other internal network system, and/or at least one of the one or more partner systems, the one or more public systems, the one or more public data systems, or other external network system, and/or the like) more secure and more transparently reliable due to the inherent validation capabilities of blockchain ledgers or the like, and the inherent capabilities of blockchain systems to clearly prevent covert replacement or modification of information contained in the blocks of the blockchain; to perform data and/or source validation on such data that is output from the equipment; to perform equipment failure prediction; and/or the like, to name a few examples, that extend beyond mere conventional computer processing operations. These functionalities can produce tangible results outside of the implementing computer system, including, merely by way of example, providing a more secure system for collection, logging, and transfer of data that is output from equipment, performing data and/or source validation on such data; and/or performing equipment failure prediction; resulting in information or data that is more reliable and more trustworthy, and/or the like, at least some results of which may be observed or measured by customers and/or service providers.

In an aspect, a method might comprise receiving, with a computing system and from a requesting device, a first request for first data that is output by first equipment; and in response to receiving the first request for the first data, retrieving, with the computing system, the first data that is output by the first equipment. The method might also comprise analyzing, with the computing system, the first data to determine whether the first data as output by the first equipment can be trusted; based on a determination that the first data as output by the first equipment is deemed to be trusted data, sending, with the computing system, the first data to the requesting device; and based on a determination that the first data is deemed to require further data validation, sending, with the computing system and to a blockchain system, a second request for identifying a blockchain containing a block containing a copy of the first data that is output by the first equipment. The method might further comprise, in response to the blockchain system identifying the blockchain containing a copy of the first data that is output by the first equipment, performing the following: receiving, with the computing system, a copy of the identified blockchain from the blockchain system; abstracting, with the computing system and from the identified blockchain, the block containing the copy of the first data; abstracting, with the computing system and from the block, the copy of the first data that is output by the first equipment; and sending, with the computing system, the first data to the requesting device.

In some embodiments, the computing system might comprise one of a data collection system, a real-time processing system, an artificial intelligence ("AI") system, a server computer, a cloud-based computing system over a network, or a distributed computing system, and/or the like. In some cases, the requesting device might comprise one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, wherein the first equipment might comprise one of an optical network device, a router, a server, an Internet of Things ("IoT") sensor, an IoT actuator, or a customer interaction data collection system, and/or the like. In some instances, the first equipment might be a virtual device, wherein the first equipment might comprise one of a virtual network device, a virtual router, a server, or a virtual customer interaction data collection system, and/or the like.

Merely by way of example, in some cases, the method might further comprise analyzing, with at least one of the computing system or the blockchain system, the first data by performing source validation on the first data. In some instances, the first data might comprise source identification information, wherein performing source validation on the first data might comprise validating the source identification information contained in the first data. In some cases, analyzing the first data might comprise analyzing, with the computing system, the first data in real-time or near-real-time. In some embodiments, the determination that the first data as output by the first equipment being deemed to be trusted data might be based on a determination that the first data as output by the first equipment is within a predetermined range of threshold values or parameters, wherein the determination that the first data is deemed to require further data validation might be based on a determination that the first data exceeds the predetermined range of threshold values or parameters.

According to some embodiments, the method might further comprise analyzing, with the computing system, the first data to predict equipment failure of the first equipment, based on analysis of the first data. The first data might comprise at least one of a status of the first equipment, a change in status of the first equipment, or one or more alerts output by the first equipment, and/or the like. In some instances, the first data might further comprise at least one of a source identifier, a date and time stamp associated with each of at least one of the status of the first equipment, the change in status of the first equipment, or the one or more alerts output by the first equipment, and/or the like.

In some embodiments, the first data might comprise at least one of one or more portions of a log of interactions between a user and a service provider, data communicated by third party service provider systems, data communicated by public service systems, or public data, and/or the like. The interactions between the user and the service provider might comprise at least one of online chats, text messages, telephone conversations, e-mail communications, software application usage, or service provider website interaction by the user, and/or the like. The public data might comprise at least one of weather data, stock data, news data, or street traffic data, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from a requesting device, a first request for first data that is output by first equipment; in response to receiving the first request for the first data, retrieve the first data that is output by the first equipment; analyze the first data to determine whether the first data as output by the first equipment can be trusted; based on a determination that the first data as output by the first equipment is deemed to be trusted data, send the first data to the requesting device; based on a determination that the first data is deemed to require further data validation, send, to a blockchain system, a second request for identifying a blockchain containing a block containing a copy of the first data that is output by the first equipment; and in response to the blockchain system identifying the blockchain containing a copy of the first data that is output by the first equipment, perform the following: receiving a copy of the identified blockchain from the blockchain system; abstracting, from the identified blockchain, the block containing the copy of the first data; abstracting, from the block, the copy of the first data that is output by the first equipment; and sending the first data to the requesting device.

In some embodiments, the apparatus might comprise one of a data collection system, a real-time processing system, an artificial intelligence ("AI") system, a server computer, a cloud-based computing system over a network, or a distributed computing system, and/or the like. In some cases, the requesting device might comprise one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like.

According to some embodiments, the set of instructions, when executed by the at least one processor, might further cause the apparatus to: analyze the first data by performing source validation on the first data. In some instances, the first data might comprise source identification information, wherein performing source validation on the first data might comprise validating the source identification information contained in the first data.

In some embodiments, the determination that the first data as output by the first equipment being deemed to be trusted data might be based on a determination that the first data as output by the first equipment is within a predetermined range of threshold values or parameters, wherein the determination that the first data is deemed to require further data validation might be based on a determination that the first data exceeds the predetermined range of threshold values or parameters.

According to some embodiments, the set of instructions, when executed by the at least one processor, might further cause the apparatus to: analyze the first data to predict equipment failure of the first equipment, based on analysis of the first data. The first data might comprise at least one of a status of the first equipment, a change in status of the first equipment, or one or more alerts output by the first equipment, and/or the like. The first data might further comprise at least one of a source identifier, a date and time stamp associated with each of at least one of the status of the first equipment, the change in status of the first equipment, or the one or more alerts output by the first equipment, and/or the like.

In some embodiments, the first data might comprise at least one of one or more portions of a log of interactions between a user and a service provider, data communicated by third party service provider systems, data communicated by public service systems, or public data, and/or the like. The interactions between the user and the service provider might comprise at least one of online chats, text messages, telephone conversations, e-mail communications, software application usage, or service provider website interaction by the user, and/or the like. The public data might comprise at least one of weather data, stock data, news data, or street traffic data, and/or the like.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a requesting device, a first request for first data that is output by first equipment; in response to receiving the first request for the first data, retrieve the first data that is output by the first equipment; analyze the first data to determine whether the first data as output by the first equipment can be trusted; based on a determination that the first data as output by the first equipment is deemed to be trusted data, send the first data to the requesting device; based on a determination that the first data is deemed to require further data validation, send, to a blockchain system, a second request for identifying a blockchain containing a block containing a copy of the first data that is output by the first equipment; and in response to the blockchain system identifying the blockchain containing a copy of the first data that is output by the first equipment, perform the following:

receiving a copy of the identified blockchain from the blockchain system; abstracting, from the identified blockchain, the block containing the copy of the first data; abstracting, from the block, the copy of the first data that is output by the first equipment; and sending the first data to the requesting device.

In an aspect, a method might comprise receiving, with a computing system and from a requesting device, a first request for first configuration data that is output by first equipment, the first configuration data being used to configure operation of the first equipment; determining, with the computing system, whether a data repository that is communicatively coupled to the computing system contains the first configuration data that is responsive to the received first request; based on a determination that the data repository contains the first configuration data that is responsive to the received first request, retrieving, with the computing system, the first configuration data that is responsive to the received first request, and sending, with the computing system, the retrieved first configuration data to the requesting device; and based on a determination that the data repository does not contain the first configuration data that is responsive to the received first request, sending, with the computing system and to a blockchain system, a second request for identifying a blockchain containing a block containing the first configuration data responsive to the received first request.

The method might further comprise, in response to the blockchain system identifying a blockchain containing a block containing the first configuration data responsive to the received first request, performing the following: receiving, with the computing system, a copy of the identified blockchain from the blockchain system; abstracting, with the computing system and from the identified blockchain, the block containing the first configuration data responsive to the received first request; abstracting, with the computing system and from the identified block, the first configuration data responsive to the received first request; and sending, with the computing system, the first configuration data to the requesting device.

In some embodiments, the computing system might comprise one of a data dissemination system, a named data system, a data collection system, a real-time processing system, an artificial intelligence ("AI") system, a server computer, a cloud-based computing system over a network, or a distributed computing system, and/or the like. In some cases, the requesting device might comprise one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like.

According to some embodiments, the first equipment might be a physical device, wherein the first equipment might comprise one of a compute node, an optical network device, a router, a server, an Internet of Things ("IoT") sensor, an IoT actuator, or a customer interaction data collection system, and/or the like. Alternatively, the first equipment might be a virtual device, wherein the first equipment might comprise one of a virtual compute node, a virtual network device, a virtual router, a virtual server, or a virtual customer interaction data collection system, and/or the like.

In some embodiments, the first configuration data might comprise second configuration data comprising at least one of basic input/output system ("BIOS") configuration data, storage configuration data, specialty card configuration data, security configuration data, operating system ("OS") configuration data, device driver configuration data, firmware configuration data, programming language translation configuration data, system utility configuration data, network configuration data, router configuration data, host configuration data, software configuration data, power configuration data, extensible firmware interface ("EFI") configuration data, or EFI system partition ("ESP") configuration data, and/or the like.

According to some embodiments, the first configuration data might further comprise third configuration data comprising at least one of information regarding who created the second configuration data, information regarding who updated the second configuration data, information regarding who changed the second configuration data, information regarding who has accessed the second configuration data, information regarding requesting devices, information regarding when the second configuration data was created, information regarding when the second configuration data was updated, information regarding when the second configuration data was changed, information regarding when the second configuration data was accessed, or geospatial data of requesting devices, and/or the like. In some cases, the first configuration data might further comprise a unique identifier ("UID") associated with one of the first equipment or the first configuration data.

In some embodiments, the method might further comprise sending, with the first equipment, fourth configuration data to at least one of the data repository or the blockchain system. In some instances, sending the fourth configuration data to the at least one of the data repository or the blockchain system might comprise sending, with the first equipment, the fourth configuration data to the at least one of the data repository or the blockchain system either periodically or in response to at least one of the fourth configuration data being created, the fourth configuration data being updated, the fourth configuration data being changed, the first equipment being configured with the fourth configuration data, configuration of the first equipment being modified using the fourth configuration data, or configuration of the first equipment being changed using the fourth configuration data, and/or the like. Alternatively, sending the fourth configuration data to the at least one of the data repository or the blockchain system might comprise sending, with the first equipment, the fourth configuration data to the at least one of the data repository or the blockchain system as beacon data.

In another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a requesting device, a first request for first configuration data that is output by first equipment, the first configuration data being used to configure operation of the first equipment; determine whether a data repository that is communicatively coupled to the computing system contains the first configuration data that is responsive to the received first request; based on a determination that the data repository contains the first configuration data that is responsive to the received first request, retrieve the first configuration data that is responsive to the received first request, and send the retrieved first configuration data to the requesting device; based on a determination that the data repository does not contain the first configuration data that is responsive to the received first request, send, to a blockchain system, a second request for identifying a blockchain containing a block containing the first configuration data responsive to the received first request; and in response to the blockchain system identifying a blockchain containing a block containing the first configuration data responsive to the received first request, perform the following: receiving a copy of the identified blockchain from the blockchain system; abstracting, from the identified blockchain, the block containing the first configuration data responsive to the received first request; abstracting, from the identified block, the first configuration data responsive to the received first request; and sending the first configuration data to the requesting device.

In some embodiments, the computing system might comprise one of a data dissemination system, a named data system, a data collection system, a real-time processing system, an artificial intelligence ("AI") system, a server computer, a cloud-based computing system over a network, or a distributed computing system, and/or the like. In some cases, the requesting device might comprise one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like.

According to some embodiments, the first equipment might be a physical device, wherein the first equipment might comprise one of a compute node, an optical network device, a router, a server, an Internet of Things ("IoT") sensor, an IoT actuator, or a customer interaction data collection system, and/or the like. Alternatively, the first equipment might be a virtual device, wherein the first equipment might comprise one of a virtual compute node, a virtual network device, a virtual router, a virtual server, or a virtual customer interaction data collection system, and/or the like.

In some embodiments, the first configuration data might comprise second configuration data comprising at least one of basic input/output system ("BIOS") configuration data, storage configuration data, specialty card configuration data, security configuration data, operating system ("OS") configuration data, device driver configuration data, firmware configuration data, programming language translation configuration data, system utility configuration data, network configuration data, router configuration data, host configuration data, software configuration data, power configuration data, extensible firmware interface ("EFI") configuration data, or EFI system partition ("ESP") configuration data, and/or the like.

According to some embodiments, the first configuration data might further comprise third configuration data comprising at least one of information regarding who created the second configuration data, information regarding who updated the second configuration data, information regarding who changed the second configuration data, information regarding who has accessed the second configuration data, information regarding requesting devices, information regarding when the second configuration data was created, information regarding when the second configuration data was updated, information regarding when the second configuration data was changed, information regarding when the second configuration data was accessed, or geospatial data of requesting devices, and/or the like. In some cases, the first configuration data might further comprise a unique identifier ("UID") associated with one of the first equipment or the first configuration data.

In yet another aspect, a method might comprise sending, with a first equipment, first configuration data to a blockchain system as beacon data either periodically or in response to at least one of the first configuration data being created, the first configuration data being updated, the first configuration data being changed, the first equipment being configured with the first configuration data, configuration of the first equipment being modified using the first configuration data, or configuration of the first equipment being changed using the first configuration data; generating, with the blockchain system, a block of a blockchain by incorporating the first configuration data into the block; validating, with the blockchain system, the generated block; and storing the blockchain containing the generated block in a data repository.

In some embodiments, the first configuration data might comprise second configuration data comprising at least one of basic input/output system ("BIOS") configuration data, storage configuration data, specialty card configuration data, security configuration data, operating system ("OS") configuration data, device driver configuration data, firmware configuration data, programming language translation configuration data, system utility configuration data, network configuration data, router configuration data, host configuration data, software configuration data, power configuration data, extensible firmware interface ("EFI") configuration data, or EFI system partition ("ESP") configuration data, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing equipment output data validation or equipment failure prediction, and, more particularly, to methods, systems, and apparatuses for utilizing blockchains to implement data and source validation for equipment output data and/or for equipment failure predict, as referred to above. FIGS. 7 and 8 illustrate some of the features of the method, system, and apparatus for implementing tracking or storing of equipment configuration data, and, more particularly, to methods, systems, and apparatuses for utilizing the immutable ledger functionality of blockchains to track and/or store equipment configuration data, as also referred to above. The methods, systems, and apparatuses illustrated by FIGS. 1-10 refer to examples of different embodiments that include various components and steps, which can be considered alternatives or which can be used in conjunction with one another in the various embodiments. The description of the illustrated methods, systems, and apparatuses shown in FIGS. 1-10 is provided for purposes of illustration and should not be considered to limit the scope of the different embodiments.

With reference to the figures, FIG. 1 is a schematic diagram illustrating a system 100 for utilizing blockchains to implement data and source validation for equipment output data and/or for equipment failure prediction, in accordance with various embodiments.

In the non-limiting embodiment of FIG. 1, system 100 might comprise computing system(s) 105 and corresponding database(s) 110. In some embodiments, the computing system(s) 105 might include, without limitation, one of a data collection system, a real-time processing system, an artificial intelligence ("AI") system, a data dissemination system, a named data system, a server computer, a cloud-based computing system over a network, or a distributed computing system, and/or the like. System 100 might further comprise one or more client or requesting devices 115a-115n (collectively, "client devices 115" or "requesting devices 115" or the like), one or more networks 120, one or more equipment 125a-125n (collectively, "equipment 125" or the like), one or more caches 130, and a blockchain system 135. In some cases, the one or more requesting devices 115 might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. The network(s) 120 might communicatively couple together the computing system(s) 105, the requesting device(s) 115, the equipment 125, the cache(s) 130, and the blockchain system 135.

In some embodiments, the blockchain system 135 might comprise a blockchain computing system 140, one or more networks 145, and peer data storage systems #1 through #N 150a-150n (collectively, "peer data storage systems 150," "distributed peer data storage systems 150," or the like), the blockchain computing system 140 and the peer data storage systems 150 being communicatively coupled to each other via network(s) 145. Each instance of a blockchain containing a plurality of blocks might be stored in two or more of the plurality of peer data storage systems 150a-150n. A non-limiting example of a blockchain (which might include hash values and such, not shown) can be seen in the embodiment of FIG. 2, which are described below. According to some embodiments, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

According to some embodiments, the network(s) 120 and/or 145 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol (e.g., LTE protocol, 5G protocol, LoRa protocol, etc.); and/or any combination of these and/or other networks. In a particular embodiment, the network(s) 120 and/or 145 might include an access network of the service provider (e.g., an Internet service provider ("ISP")).

In another embodiment, the network(s) 120 and/or 145 might include a core network of the service provider, and/or the Internet.

In operation, a user, using a requesting device (e.g., at least one of requesting devices 115a-115n, or the like), might send a first request for data that is output by first equipment (one of equipment 125a-125n, which might include, without limitation, at least one of the one or more optical equipment, the one or more routers, the one or more servers, the one or more VMs, the one or more customer interaction systems, or other internal network system, and/or at least one of the one or more partner systems, the one or more public systems, the one or more public data systems, or other external network system, and/or the like). The computing system 105 might receive the first request from the requesting device via an API or the like. The computing system 105 might determine whether cache(s) 130 might contain data that is responsive to the received first request (e.g., data that is output by first equipment, or the like). In some embodiments, the computing system 105 might also determine whether such data that is responsive to the received first request (i.e., data that is output by the first equipment, etc.) can be trusted. Based on a determination that the cache(s) 130 contains data that is responsive to the received first request and based on a determination that such data (which includes data as output by first equipment) can be trusted, the computing system 105 might retrieve the data that is responsive to the received first request, and might send the retrieved data to the requesting device. On the other hand, based on a determination that the cache(s) 130 does not contain data that is responsive to the received first request and/or based on a determination that data that is stored in the cache(s) 130 and that is responsive to the received first request cannot be trusted, the computing system 105 might send, to the blockchain system 135 or blockchain computing system 140, a second request for identifying a blockchain (e.g., blockchain 205 of FIG. 2, or the like) containing a block containing data responsive to the received first request (i.e., data that is output by the first equipment, or the like). In response to the blockchain system 135 or blockchain computing system 140 identifying a blockchain containing a block containing data responsive to the received first request, the computing system 105, the blockchain system 135, or blockchain computing system 140 might receive a copy of the identified blockchain from the blockchain system 135 or blockchain computing system 140. The computing system 105, the blockchain system 135, or blockchain computing system 140 might abstract, from the identified blockchain, the block containing the data responsive to the received first request; might abstract, from the block, the data responsive to the received first request (i.e., the copy of the data that is output by the first equipment, in this case); and might send the data (i.e., the data that is output by the first equipment) to the requesting device.

In some embodiments, the computing system 105 might each include, without limitation, one of a data collection system, a real-time processing system, an artificial intelligence ("AI") system, a server computer, a cloud-based computing system over a network, or a distributed computing system, and/or the like. In some cases, the requesting devices 115 might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, where the first equipment might include, without limitation, one of an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual network device, a virtual router, a server, or a virtual customer interaction data collection system, and/or the like.

In some aspects, the computing system 105, the blockchain system 135, or the blockchain computing system 140 might analyze the first data by performing at least one of data validation (as depicted, e.g., in FIG. 3 by arrows extending from blockchain interfaces 370' that are denoted "dv") and/or source validation (as depicted, e.g., in FIG. 3 by arrows extending from blockchain interfaces 370' that are denoted "sv") on the first data. In some cases, the first data might comprise source identification information, where performing source validation on the first data might comprise validating the source identification information contained in the first data. In some embodiments, the computing system 105 might perform at least one of data validation and/or source validation using a combination of two or more of a real-time processing system, an intelligence system, an intelligence algorithms, and a support systems (which might include, without limitation, business, operations, or development systems, etc.), and/or the like. Data and/or source validation may, in some embodiments, also be performed at cache(s) 130. In some instances, analyzing the first data might comprise analyzing, with the computing system 105, the first data in real-time or near-real-time.

Merely by way of example, in some instances, the determination that the first data as output by the first equipment being deemed to be trusted data might be based on a determination that the first data as output by the first equipment is within a predetermined range of threshold values or parameters, where the determination that the first data is deemed to require further data validation might be based on a determination that the first data exceeds the predetermined range of threshold values or parameters.

According to some embodiments, the computing system 105 might analyze the first data to predict equipment failure of the first equipment, based on analysis of the first data, where the first data might include, without limitation, at least one of a status of the first equipment, a change in status of the first equipment, or one or more alerts output by the first equipment, and/or the like. In some cases, the first data might further include, but is not limited to, at least one of a source identifier, a date and time stamp associated with each of at least one of the status of the first equipment, the change in status of the first equipment, or the one or more alerts output by the first equipment, and/or the like.

In some embodiments, the first data might include, without limitation, at least one of one or more portions of a log of interactions between a user and a service provider, data communicated by third party service provider systems, data communicated by public service systems, or public data, and/or the like. In such cases, the interactions between the user and the service provider might include, but is not limited to, at least one of online chats, text messages, telephone conversations, e-mail communications, software application usage, or service provider website interaction by the user, and/or the like. In some instances, the public data might include, without limitation, at least one of weather data, stock data, news data, or street traffic data, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 135 or blockchain computing system 140, in one or more first blocks of a first blockchain. In some instances, the usage data for the network device and the geolocation information for the network device might be abstracted from usage data records and stored, via the blockchain system 135 or blockchain computing system 140, in one or more second blocks of a second blockchain. Alternatively, or additionally, the data control information for the network device might be abstracted from application programming interface ("API") calls and stored, via the blockchain system 135 or blockchain computing system 140, in one or more third blocks of a third blockchain. Alternatively, or additionally, the information regarding critical events associated with the network device might be abstracted from a simple network management protocol ("SNMP") events system and stored, via the blockchain system 135 or blockchain computing system 140, in one or more fourth blocks of a fourth blockchain. Alternatively, or additionally, the information regarding open trouble tickets might be abstracted from a trouble tickets system and stored, via the blockchain system 135 or blockchain computing system 140, in one or more fifth blocks of a fifth blockchain. Alternatively, or additionally, the information regarding data monetization for the network device might be abstracted from a network server and stored, via the blockchain system 135 or blockchain computing system 140, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system(s) 105 and to the blockchain system 130, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

Merely by way of example, in some cases, computing system(s) 105 might generate a reputation score of a network device based on metadata regarding the network device that is stored in a block of the blockchain that is generated by the blockchain system, wherein the first request comprises a request for the reputation score of the network device. Alternatively, or additionally, computing system(s) 105 might receive second data from a second block of a second blockchain; and might determine whether the second data is (or is not) suitable for caching in the cache. Based on a determination that the second data is suitable for caching in the cache, computing system(s) 105 might store the second data in the cache; and might update the second block of the second blockchain by recording a first flag indicating that the second data is cachable and has been stored in the cache. On the other hand, based on a determination that the second data is not suitable for caching in the cache, computing system(s) 105 might update the second block of the second blockchain by recording a second flag indicating that the second data is not suitable for storing in the cache. In this manner, by checking the flag (whether it is a first flag or a second flag, or the like), the computing system(s) 105 might more easily determine whether or not data is suitable for storing in the cache (i.e., whether such data are cachable or non-cachable, or the like).

In some embodiments, determining whether the cache that is communicatively coupled to the computing system(s) 105 contains data that is responsive to the received first request might comprise accessing, with the computing system(s) 105, the cache via a listening port and one or more application programming interfaces ("APIs"). Alternatively, or additionally, determining whether the cache that is communicatively coupled to the computing system(s) 105 contains data that is responsive to the received first request might comprise querying, with the computing system(s) 105, a record of blockchain information to determine whether a flag associated with the data that is responsive to the received first request indicates that the data is cachable and is stored in the cache. In some cases, the determination that the cache contains data that is responsive to the received first request might be based on a determination that the flag associated with the data that is responsive to the received first request indicates that the data is cachable and is stored in the cache, while the determination that the cache does not contain data that is responsive to the received first request might be based on a determination that the flag associated with the data that is responsive to the received first request indicates either that the data is non-cachable or that the data is not stored in the cache.

According to some embodiments, rather than retrieving the data that is responsive to the received first request based on a determination that the cache contains data that is responsive to the received first request, the computing system(s) 105 might first perform verification or authentication tests, including, but not limited to, tests based on time to live ("TTL") analysis to determine timestamps indicating when such data was stored in the cache and to determine what such data's TTL might be (e.g., 1 hour, 1 day, 1 week, 1 month, etc.). Based on a determination that such data was stored for a period exceeding its TTL, then such data may be considered to be untrustworthy, and the computing system(s) 105 might determine that the cache does not contain data that is responsive to the received first request (and thus might send the second request to the blockchain system, as described in detail above). On the other hand, based on a determination that such data was stored for a period within its TTL, then the computing system(s) 105 might consider such data to be trustworthy, and might proceed to retrieve the data from the cache and might send the retrieved data to the requesting device.

These and other functionalities of the various embodiments are described in detail below with respect to FIGS. 2-6.

Figure 2:
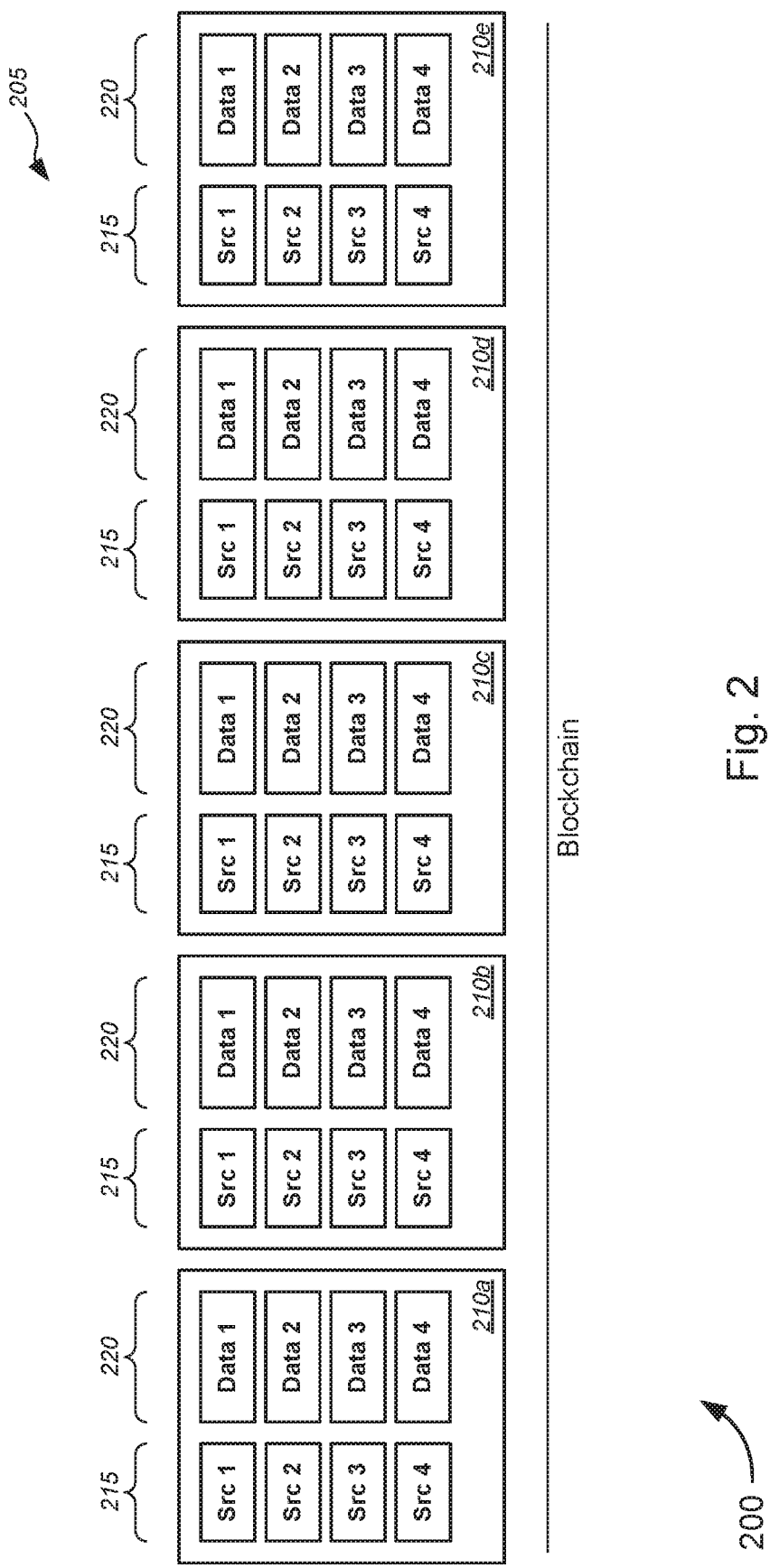
FIG. 2 is a schematic diagram illustrating an example of a blockchain that may be used by a system that utilizes blockchains to implement data and source validation for equipment output data and/or for equipment failure prediction, in accordance with various embodiments.

FIG. 2 is a schematic diagram illustrating an example 200 of a blockchain that may be used by a system that utilizes blockchains to implement data and source validation for equipment output data and/or for equipment failure prediction, in accordance with various embodiments.

With reference to FIG. 2, an example 200 of a blockchain 205 is depicted. Blockchain 205 might comprise a plurality of blocks 210a-210e (collectively, "blocks 210" or the like), each block 210 containing one or more source fields #1-#4 215 and/or one or more data fields #1-#4 220. The source fields 215 might each contain information regarding a source corresponding data (e.g., source field #1 might correspond to data field #1, and so on). For purposes of simplicity of illustration, only five blocks 210 are shown in the blockchain 205 in FIG. 2, although blockchain 205 might comprise any suitable number of blocks 210. Although only four source fields 215 are shown in each block 210, the various embodiments are not so limited, and blockchains 205 might contain any suitable number of source fields 215. Similarly, although only four data fields 220 are shown in each block 210, the various embodiments are not so limited, and blockchains 205 might contain any suitable number of data fields 220. Although not shown, each block 210 might also contain other data or fields, including, but not limited to, block number fields, nonce field, data and/or time stamp fields, previous hash field, hash field, and/or the like. As described herein with respect to FIGS. 1 and 3-6, source validation may be performed on the data contained in the source fields 215, while data validation may be performed on the data contained in the data fields 220.

Figure 3:
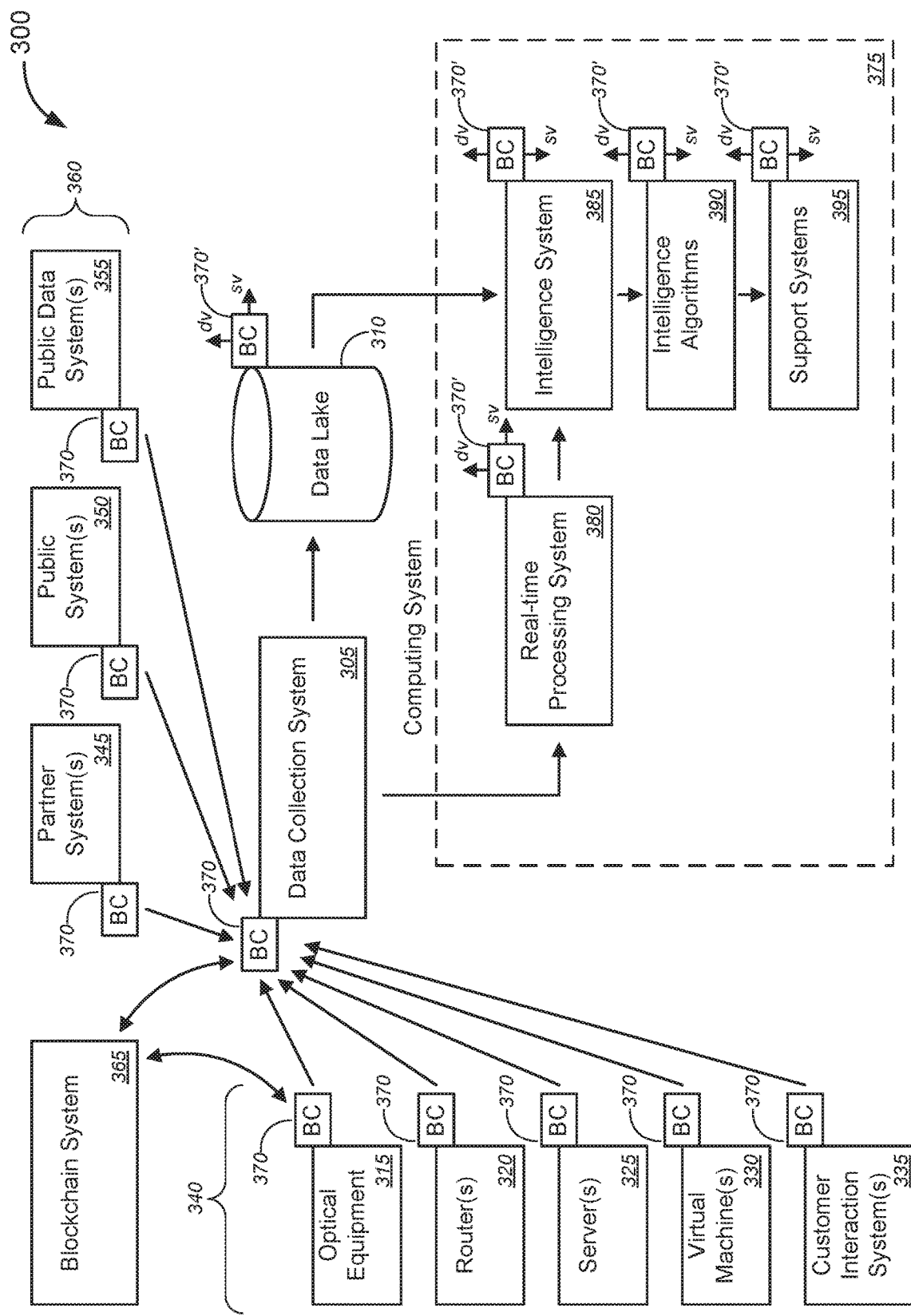
FIG. 3 is a schematic diagram illustrating another system for utilizing blockchains to implement data and source validation for equipment output data and/or for equipment failure prediction, in accordance with various embodiments.

FIG. 3 is a schematic diagram illustrating another system 300 for utilizing blockchains to implement data and source validation for equipment output data and/or for equipment failure prediction, in accordance with various embodiments.

In the non-limiting embodiment of FIG. 3, system 300 might comprise a data collection system 305 and a data lake 310. System 300 might further comprise at least one of one or more optical equipment 315, one or more routers 320, one or more servers 325, one or more virtual machines ("VMs") 330, or one or more customer interaction systems 335, and/or the like (collectively, "internal network systems 340" or the like), each of which might be part of, or internal to, the network systems of a service provider. System 300 might further comprise at least one of one or more partner systems 345, one or more public systems 350, or one or more public data systems 355 (e.g., systems providing or collecting data regarding weather, stocks, news, street traffic, etc.), and/or the like (collectively, "external network systems 360" or the like), each of which might be external to the network systems of the service provider. System 300 might further comprise blockchain system 365, a plurality of blockchain interfaces 370 or 370', and/or the like. System 300 might further comprise computing system 375, which might include, without limitation, at least one of real-time processing system 380, intelligence system 385, one or more intelligence algorithms 390, or one or more support systems 395, and/or the like.

In conventional systems, information or data from devices or from logging or record systems might be received by data dissemination systems or data collection systems. Such information or data, however, may be susceptible to interception by nefarious parties and/or spoofing by such parties, thus resulting in information or data that is unreliable or untrustworthy. The various embodiments described herein (such as system 300 of FIG. 3, or the like) utilize the functionalities, advantages, and features of blockchain systems to make such information or data more secure and more transparently reliable due to the inherent validation capabilities of blockchain ledgers or the like, and the inherent capabilities of blockchain systems to clearly prevent covert replacement or modification of information contained in the blocks of the blockchain.

In particular, with reference to the non-limiting embodiment of FIG. 3, the blockchain system 365 or the blockchain interfaces 370 or 370' might encode or store, in one or more blocks of blockchains, data that is collected, sent, or stored by each of at least one of the data collection system 305, the data lake 310, the one or more optical equipment 315, the one or more routers 320, the one or more servers 325, the one or more VMs 330, the one or more customer interaction systems 335, the one or more partner systems 345, the one or more public systems 350, the one or more public data systems 355, the real-time processing system 380, the intelligence system 385, the one or more intelligence algorithms 390, or the one or more support systems 395, or the like.

In operation, a user, using a requesting device (e.g., requesting device(s) 115a-115n of FIG. 1, or the like), might send a first request for data that is output by first equipment (e.g., at least one of the one or more optical equipment 315, the one or more routers 320, the one or more servers 325, the one or more VMs 330, the one or more customer interaction systems 335, or other internal network system 340, and/or at least one of the one or more partner systems 345, the one or more public systems 350, the one or more public data systems 355, or other external network system 360, and/or the like). The data collection system 305 or computing system 375 might receive the first request from the first requesting device via an API or the like. The data collection system 305 or computing system 375 might determine whether data lake 310 might contain data that is responsive to the received first request (e.g., data that is output by first equipment, or the like). In some embodiments, the data collection system 305 or computing system 375 might also determine whether such data that is responsive to the received first request (i.e., data that is output by the first equipment, etc.) can be trusted. Based on a determination that the data lake 310 contains data that is responsive to the received first request and based on a determination that such data (which includes data as output by first equipment) can be trusted, the data collection system 305 or computing system 375 might retrieve the data that is responsive to the received first request, and might send the retrieved data to the requesting device. On the other hand, based on a determination that the data lake 310 does not contain data that is responsive to the received first request and/or based on a determination that data that is stored in the data lake 310 and that is responsive to the received first request cannot be trusted, the data collection system 305 or computing system 375 might send, to the blockchain system 365, a second request for identifying a blockchain (e.g., blockchain 205 of FIG. 2, or the like) containing a block containing data responsive to the received first request (i.e., data that is output by the first equipment, or the like). In response to the blockchain system 365 identifying a blockchain containing a block containing data responsive to the received first request, the data collection system 305 or the blockchain system 365 might receive a copy of the identified blockchain from the blockchain system 365. The data collection system 305 or the blockchain system 365 might abstract, from the identified blockchain, the block containing the data responsive to the received first request; might abstract, from the block, the data responsive to the received first request (i.e., the copy of the data that is output by the first equipment, in this case); and might send the data (i.e., the data that is output by the first equipment) to the requesting device.

In some embodiments, the data collection system 305 might each include, without limitation, one of a data collection system, a real-time processing system, an artificial intelligence ("AI") system, a server computer, a cloud-based computing system over a network, or a distributed computing system, and/or the like. In some cases, the requesting devices might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, where the first equipment might include, without limitation, one of an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual network device, a virtual router, a server, or a virtual customer interaction data collection system, and/or the like.

In some aspects, the data collection system 305, the computing system 375, or the blockchain system 365 might analyze the first data by performing at least one of data validation (depicted in FIG. 3 by arrows extending from blockchain interfaces 370' that are denoted "dv") and/or source validation (depicted in FIG. 3 by arrows extending from blockchain interfaces 370' that are denoted "sv") on the first data. In some cases, the first data might comprise source identification information, where performing source validation on the first data might comprise validating the source identification information contained in the first data. In some embodiments, the computing system 375 might perform at least one of data validation and/or source validation using a combination of two or more of the real-time processing system 380, the intelligence system 385, the intelligence algorithms 390, and the support systems 395 (which might include, without limitation, business, operations, or development systems, etc.), and/or the like. Data and/or source validation may, in some embodiments, also be performed at data lake 310. In some instances, analyzing the first data might comprise analyzing, with the computing system 375, the first data in real-time or near-real-time.

Merely by way of example, in some instances, the determination that the first data as output by the first equipment being deemed to be trusted data might be based on a determination that the first data as output by the first equipment is within a predetermined range of threshold values or parameters, where the determination that the first data is deemed to require further data validation might be based on a determination that the first data exceeds the predetermined range of threshold values or parameters.

According to some embodiments, the data collection system 305 might analyze the first data to predict equipment failure of the first equipment, based on analysis of the first data, where the first data might include, without limitation, at least one of a status of the first equipment, a change in status of the first equipment, or one or more alerts output by the first equipment, and/or the like. In some cases, the first data might further include, but is not limited to, at least one of a source identifier, a date and time stamp associated with each of at least one of the status of the first equipment, the change in status of the first equipment, or the one or more alerts output by the first equipment, and/or the like.

In some embodiments, the first data might include, without limitation, at least one of one or more portions of a log of interactions between a user and a service provider, data communicated by third party service provider systems, data communicated by public service systems, or public data, and/or the like. In such cases, the interactions between the user and the service provider might include, but is not limited to, at least one of online chats, text messages, telephone conversations, e-mail communications, software application usage, or service provider website interaction by the user, and/or the like. In some instances, the public data might include, without limitation, at least one of weather data, stock data, news data, or street traffic data, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 365, in one or more first blocks of a first blockchain. In some instances, the usage data for the network device and the geolocation information for the network device might be abstracted from usage data records and stored, via the blockchain system 365, in one or more second blocks of a second blockchain. Alternatively, or additionally, the data control information for the network device might be abstracted from application programming interface ("API") calls and stored, via the blockchain system 365, in one or more third blocks of a third blockchain. Alternatively, or additionally, the information regarding critical events associated with the network device might be abstracted from a simple network management protocol ("SNMP") events system and stored, via the blockchain system 365, in one or more fourth blocks of a fourth blockchain. Alternatively, or additionally, the information regarding open trouble tickets might be abstracted from a trouble tickets system and stored, via the blockchain system 365, in one or more fifth blocks of a fifth blockchain. Alternatively, or additionally, the information regarding data monetization for the network device might be abstracted from a network server and stored, via the blockchain system 365, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Figure 4A:
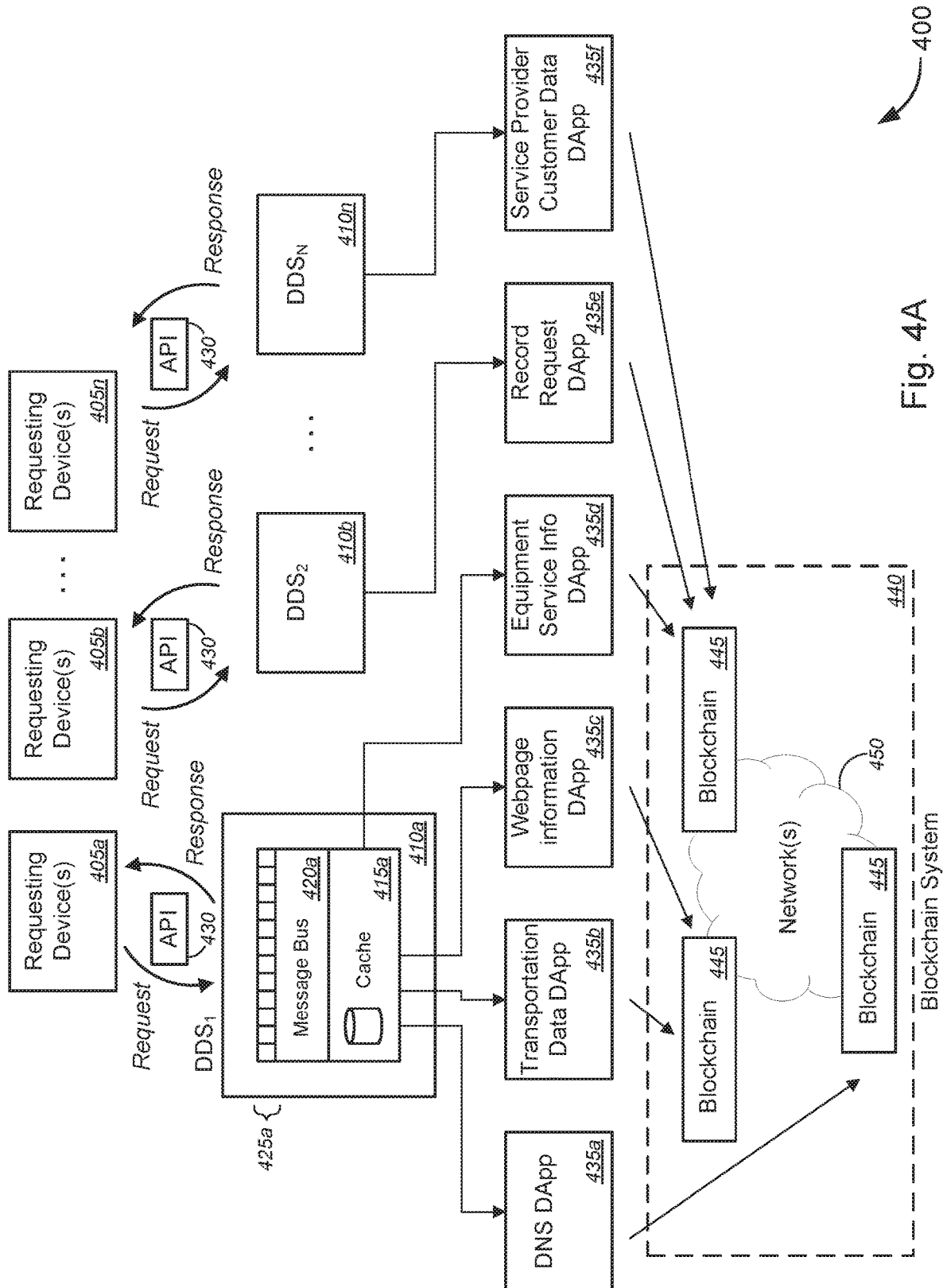

FIGS. 4A and 4B (collectively, "FIG. 4") are schematic diagrams illustrating various embodiments 400 and 400' for yet another system for utilizing blockchains to implement data and source validation for equipment output data and/or for equipment failure prediction, in accordance with various embodiments.

In the non-limiting embodiment of FIG. 4, system 400 or 400' might comprise one or more requesting devices 405a-405n (collectively, "requesting devices 405" or the like) and one or more data dissemination systems ("DDSs") #1-#N 410a-410n (collectively, "DDSs 410" or the like). According to some embodiments, each DDS 410 might comprise a cache 415, a message bus 420, and a plurality of listening ports 425 (e.g., listening ports 80/443, listening ports 53, and/or the like). For example, the first DDS (e.g., DDS #1) 410a might comprise a first cache 415a, a first message bus 420a, and a plurality of first listening ports 425a, and so on. System 400 or 400' might further comprise a plurality of application programming interfaces ("APIs") 430 communicatively coupling the one or more requesting devices 405 and the DDSs 410, relaying requests from the requesting devices 405 to the DDSs 410 while relaying responses back from the DDSs 410 to the requesting devices 405.

In operation, a user, using a first requesting device 405a, might send a first request for data that is output by first equipment. A first DDS 410a might receive the first request from the first requesting device 405a via an API 430. The first DDS 410a might determine whether a local cache 415a might contain data that is responsive to the received first request, by routing the first request through one or more first listening ports 425a via first message bus 420a. In some embodiments, the first DDS 410a might also determine whether such data that is responsive to the received first request (i.e., data that is output by the first equipment, etc.) can be trusted. Based on a determination that the local cache 415a contains data that is responsive to the received first request and based on a determination that such data (which includes data as output by first equipment) can be trusted, the first DDS 410a might retrieve the data that is responsive to the received first request, and might send the retrieved data to the first requesting device 405a via the first message bus 420a, the one or more first listening ports, and the API 430. On the other hand, based on a determination that the local cache 415a does not contain data that is responsive to the received first request and/or based on a determination that data that is stored in the local cache 415a and that is responsive to the received first request cannot be trusted, the first DDS 410a might send, to a blockchain system 440 or 440' via one or more decentralized applications ("DApps") 435 among a plurality of DApps (which might include, but is not limited to, a domain name system ("DNS") DApp 435a, a transportation data DApp 435b (e.g., airline data DApp, bus data DApp, train data DApp, etc.), a webpage information DApp 435c, an equipment service information DApp 435d, a record request DApp 435e, a service provider customer data DApp 435f, and/or the like), a second request for identifying a blockchain (one or more of blockchains 445 of network(s) 450) containing a block containing data responsive to the received first request. In response to the blockchain system 440 or 440' identifying a blockchain 445 containing a block containing data responsive to the received first request, the first DDS 410a or the blockchain system 440 or 440' might receive a copy of the identified blockchain from the blockchain system 440 or 440'. The first DDS 410a or the blockchain system 440 or 440' might abstract, from the identified blockchain 445, the block containing the data responsive to the received first request; might abstract, from the block, the data responsive to the received first request (i.e., the copy of the first data that is output by the first equipment, in this case); and might send the data (i.e., the first data) to the first requesting device 405a via the one or more DApps 435, the first message bus 420a (and in some cases, via the first cache 415a, or the like), the one or more first listening ports 425a, and the API 430.

In some embodiments, the DDS 410a-410n might each include, without limitation, one of a data collection system, a real-time processing system, an artificial intelligence ("AI") system, a server computer, a cloud-based computing system over a network, or a distributed computing system, and/or the like. In some cases, the requesting devices 405a-405n might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, where the first equipment might include, without limitation, one of an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual network device, a virtual router, a server, or a virtual customer interaction data collection system, and/or the like.

In some aspects, the DDS 410 or the blockchain system 440 might analyze the first data by performing at least one of data validation and/or source validation on the first data. In some cases, the first data might comprise source identification information, where performing source validation on the first data might comprise validating the source identification information contained in the first data. In some instances, analyzing the first data might comprise analyzing, with the DDS 410 or the blockchain system 440, the first data in real-time or near-real-time.

Merely by way of example, in some instances, the determination that the first data as output by the first equipment being deemed to be trusted data might be based on a determination that the first data as output by the first equipment is within a predetermined range of threshold values or parameters, where the determination that the first data is deemed to require further data validation might be based on a determination that the first data exceeds the predetermined range of threshold values or parameters.

According to some embodiments, at least one of the DDS 410a-410n might analyze the first data to predict equipment failure of the first equipment, based on analysis of the first data, where the first data might include, without limitation, at least one of a status of the first equipment, a change in status of the first equipment, or one or more alerts output by the first equipment, and/or the like. In some cases, the first data might further include, but is not limited to, at least one of a source identifier, a date and time stamp associated with each of at least one of the status of the first equipment, the change in status of the first equipment, or the one or more alerts output by the first equipment, and/or the like.

In some embodiments, the first data might include, without limitation, at least one of one or more portions of a log of interactions between a user and a service provider, data communicated by third party service provider systems, data communicated by public service systems, or public data, and/or the like. In such cases, the interactions between the user and the service provider might include, but is not limited to, at least one of online chats, text messages, telephone conversations, e-mail communications, software application usage, or service provider website interaction by the user, and/or the like. In some instances, the public data might include, without limitation, at least one of weather data, stock data, news data, or street traffic data, and/or the like.

According to some embodiments, the first request might comprise a DNS request, where the data that is responsive to the received first request might comprise a DNS response comprising an Internet protocol ("IP") address associated with a website. In such cases, sending the second request to the blockchain system 440 or 440' might comprise sending, with the first DDS 410a and to the blockchain system 440 or 440', the second request via a DNS DApp (e.g., DNS DApp 435a, or the like). In some embodiments, the first request might comprise a hypertext transfer protocol ("HTTP") record request, where the data that is responsive to the received first request might comprise a JavaScript object notation ("JSON") record response. In such cases, sending the second request to the blockchain system 440 or 440' might comprise sending, with the first DDS 410a and to the blockchain system 440 or 440', the second request via a record request DApp (e.g., record request DApp 435e, or the like).

In some embodiments, the first request might include, but is not limited to, one of service provider customer data, webpage information, or equipment service information, and/or the like. In some cases, sending the second request to the blockchain system 440 or 440' might comprise sending, with the first DDS 410a and to the blockchain system 440 or 440', the second request via corresponding one of a service provider customer data DApp (e.g., service provider customer data DApp 435f, or the like), a webpage information DApp (e.g., webpage information DApp 435c, or the like), or an equipment service information DApp (e.g., equipment service information DApp 435d, or the like), and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 440 or 440', in one or more first blocks of a first blockchain. In some instances, the usage data for the network device and the geolocation information for the network device might be abstracted from usage data records and stored, via the blockchain system 440 or 440', in one or more second blocks of a second blockchain. Alternatively, or additionally, the data control information for the network device might be abstracted from application programming interface ("API") calls and stored, via the blockchain system 440 or 440', in one or more third blocks of a third blockchain. Alternatively, or additionally, the information regarding critical events associated with the network device might be abstracted from a simple network management protocol ("SNMP") events system and stored, via the blockchain system 440 or 440', in one or more fourth blocks of a fourth blockchain. Alternatively, or additionally, the information regarding open trouble tickets might be abstracted from a trouble tickets system and stored, via the blockchain system 440 or 440', in one or more fifth blocks of a fifth blockchain. Alternatively, or additionally, the information regarding data monetization for the network device might be abstracted from a network server and stored, via the blockchain system 440 or 440', in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Referring to FIG. 4, in the non-limiting embodiment 400 of FIG. 4A, blockchain system 440 might comprise the blockchains 445 and the network(s) 450, while, in the non-limiting embodiment 400' of FIG. 4B, blockchain system 440' might comprise the blockchains 445, the network(s) 450, and the plurality of DApps 435.

Figure 5:
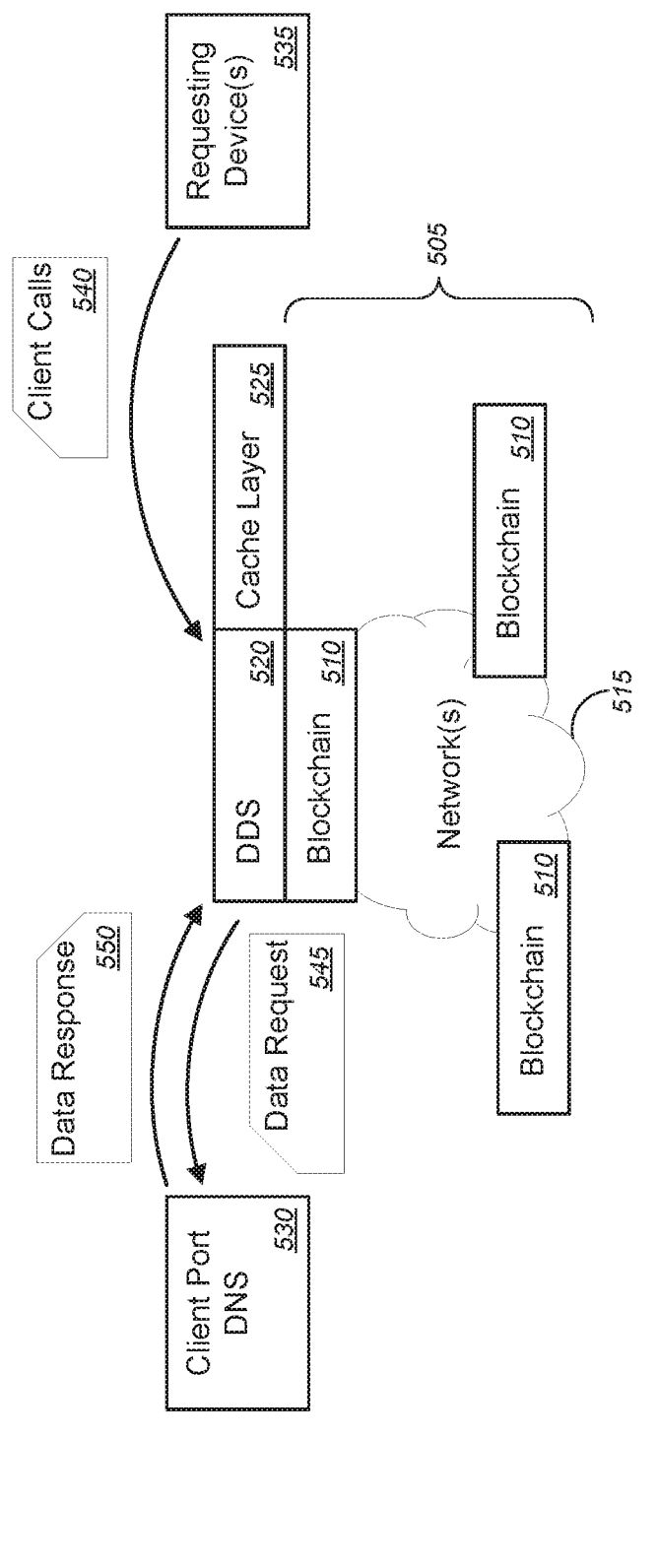
FIG. 5 is a schematic diagram illustrating an embodiment for still another system for utilizing blockchains to implement data and source validation for equipment output data and/or for equipment failure prediction, in accordance with various embodiments.

FIG. 5 is a schematic diagram illustrating an embodiment 500 for still another system for utilizing blockchains to implement data and source validation for equipment output data and/or for equipment failure prediction, in accordance with various embodiments.

In the non-limiting embodiment of FIG. 5, system 500 might comprise a blockchain system 505, which might comprise a plurality of blockchains 510 in network(s) 515. System 500 might comprise at least one data dissemination system ("DDS") 520, a cache layer 525, a client port domain name system ("DNS") 530, and a requesting device(s) 535.

In operation, a user, using requesting device(s) 535, might send a first request for data (e.g., client call(s) 540, or the like) that is output by first equipment. In some cases, the DDS 520 might receive the first request (e.g., client call(s) 540, or the like) from the requesting device(s) 535 via an API or the like (e.g., API 430 of FIG. 4, or the like). The DDS 520 might determine whether cache layer 525 might contain data that is responsive to the received first request (e.g., client call(s) 540, or the like). In some embodiments, the DDS 520 might also determine whether such data that is responsive to the received first request (i.e., data that is output by the first equipment, etc.) can be trusted. Based on a determination that cache layer 525 contains data that is responsive to the received first request (e.g., client call(s) 540, or the like) and based on a determination that such data (which includes data as output by first equipment) can be trusted, the DDS 520 might retrieve, from cache layer 525, the data that is responsive to the received first request (e.g., client call(s) 540, or the like), and might send the retrieved data to the requesting device(s) 535. On the other hand, based on a determination that cache layer 525 does not contain data that is responsive to the received first request (e.g., client call(s) 540, or the like) and/or based on a determination that data that is stored in the local cache 415*a* and that is responsive to the received first request cannot be trusted, the DDS 520 might send, to a blockchain system 505 (in some cases, via one or more decentralized applications ("DApps"), or the like), a second request for identifying a blockchain (one or more of blockchains 510 of network(s) 515) containing a block containing data responsive to the received first request (e.g., client call(s) 540, or the like). In response to the blockchain system 505 identifying a blockchain 510 containing a block containing data responsive to the received first request (e.g., client call(s) 540, or the like), the DDS 520 or the blockchain system 505 might receive a copy of the identified blockchain from the blockchain system 505. The DDS 520 or the blockchain system 505 might abstract, from the identified blockchain 510, the block containing the data responsive to the received first request (e.g., client call(s) 540, or the like) (i.e., the copy of the first data that is output by the first equipment, in this case); might abstract, from the block, the data responsive to the received first request (e.g., client call(s) 540, or the like) (i.e., the copy of the first data that is output by the first equipment, in this case); and might send the data (i.e., the first data) to the requesting device(s) 535.

In some embodiments, the DDS 520 might each include, without limitation, one of a data collection system, a real-time processing system, an artificial intelligence ("AI") system, a server computer, a cloud-based computing system over a network, or a distributed computing system, and/or the like. In some cases, the requesting devices 535 might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, where the first equipment might include, without limitation, one of an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual network device, a virtual router, a server, or a virtual customer interaction data collection system, and/or the like.

In some aspects, the DDS 520 or the blockchain system 505 might analyze the first data by performing at least one of data validation and/or source validation on the first data. In some cases, the first data might comprise source identification information, where performing source validation on the first data might comprise validating the source identification information contained in the first data. In some instances, analyzing the first data might comprise analyzing, with the DDS 520 or the blockchain system 505, the first data in real-time or near-real-time.

Merely by way of example, in some instances, the determination that the first data as output by the first equipment being deemed to be trusted data might be based on a determination that the first data as output by the first equipment is within a predetermined range of threshold values or parameters, where the determination that the first data is deemed to require further data validation might be based on a determination that the first data exceeds the predetermined range of threshold values or parameters.

According to some embodiments, at least one of the DDS 520 might analyze the first data to predict equipment failure of the first equipment, based on analysis of the first data, where the first data might include, without limitation, at least one of a status of the first equipment, a change in status of the first equipment, or one or more alerts output by the first equipment, and/or the like. In some cases, the first data might further include, but is not limited to, at least one of a source identifier, a date and time stamp associated with each of at least one of the status of the first equipment, the change in status of the first equipment, or the one or more alerts output by the first equipment, and/or the like.

In some embodiments, the first data might include, without limitation, at least one of one or more portions of a log of interactions between a user and a service provider, data communicated by third party service provider systems, data communicated by public service systems, or public data, and/or the like. In such cases, the interactions between the user and the service provider might include, but is not limited to, at least one of online chats, text messages, telephone conversations, e-mail communications, software application usage, or service provider website interaction by the user, and/or the like. In some instances, the public data might include, without limitation, at least one of weather data, stock data, news data, or street traffic data, and/or the like.

According to some embodiments, the first request (e.g., client call(s) 540, or the like) might comprise a DNS request, where the data that is responsive to the received first request (e.g., client call(s) 540, or the like) might comprise a DNS response comprising an Internet protocol ("IP") address associated with a website. In such cases, sending the second request to the blockchain system 505 might comprise sending, with the DDS 520 and to the blockchain system 505, the second request via a DNS DApp (e.g., DNS DApp 435*a* of FIG. 4, or the like). In some embodiments, the first request (e.g., client call(s) 540, or the like) might comprise a hypertext transfer protocol ("HTTP") record request, where the data that is responsive to the received first request (e.g., client call(s) 540, or the like) might comprise a JavaScript object notation ("JSON") record response. In such cases, sending the second request to the blockchain system 505 might comprise sending, with the DDS 520 and to the blockchain system 505, the second request via a record request DApp (e.g., record request DApp 435*e* of FIG. 4, or the like).

In some embodiments, the first request (e.g., client call(s) 540, or the like) might include, but is not limited to, one of service provider customer data, webpage information, or equipment service information, and/or the like. In some cases, sending the second request to the blockchain system 505 might comprise sending, with the DDS 520 and to the blockchain system 505, the second request via corresponding one of a service provider customer data DApp (e.g., service provider customer data DApp 435*f* of FIG. 4, or the like), a webpage information DApp (e.g., webpage information DApp 435*c* of FIG. 4, or the like), or an equipment service information DApp (e.g., equipment service information DApp 435*d* of FIG. 4, or the like), and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request (e.g., client call(s) 540, or the like) might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 505, in one or more first blocks of a first blockchain. In some instances, the usage data for the network device and the geolocation information for the network device might be abstracted from usage data records and stored, via the blockchain system 505, in one or more second blocks of a second blockchain. Alternatively, or additionally, the data control information for the network device might be abstracted from application programming interface ("API") calls and stored, via the blockchain system 505, in one or more third blocks of a third blockchain. Alternatively, or additionally, the information regarding critical events associated with the network device might be abstracted from a simple network management protocol ("SNMP") events system and stored, via the blockchain system 505, in one or more fourth blocks of a fourth blockchain. Alternatively, or additionally, the information regarding open trouble tickets might be abstracted from a trouble tickets system and stored, via the blockchain system 505, in one or more fifth blocks of a fifth blockchain. Alternatively, or additionally, the information regarding data monetization for the network device might be abstracted from a network server and stored, via the blockchain system 505, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Figure 6A:
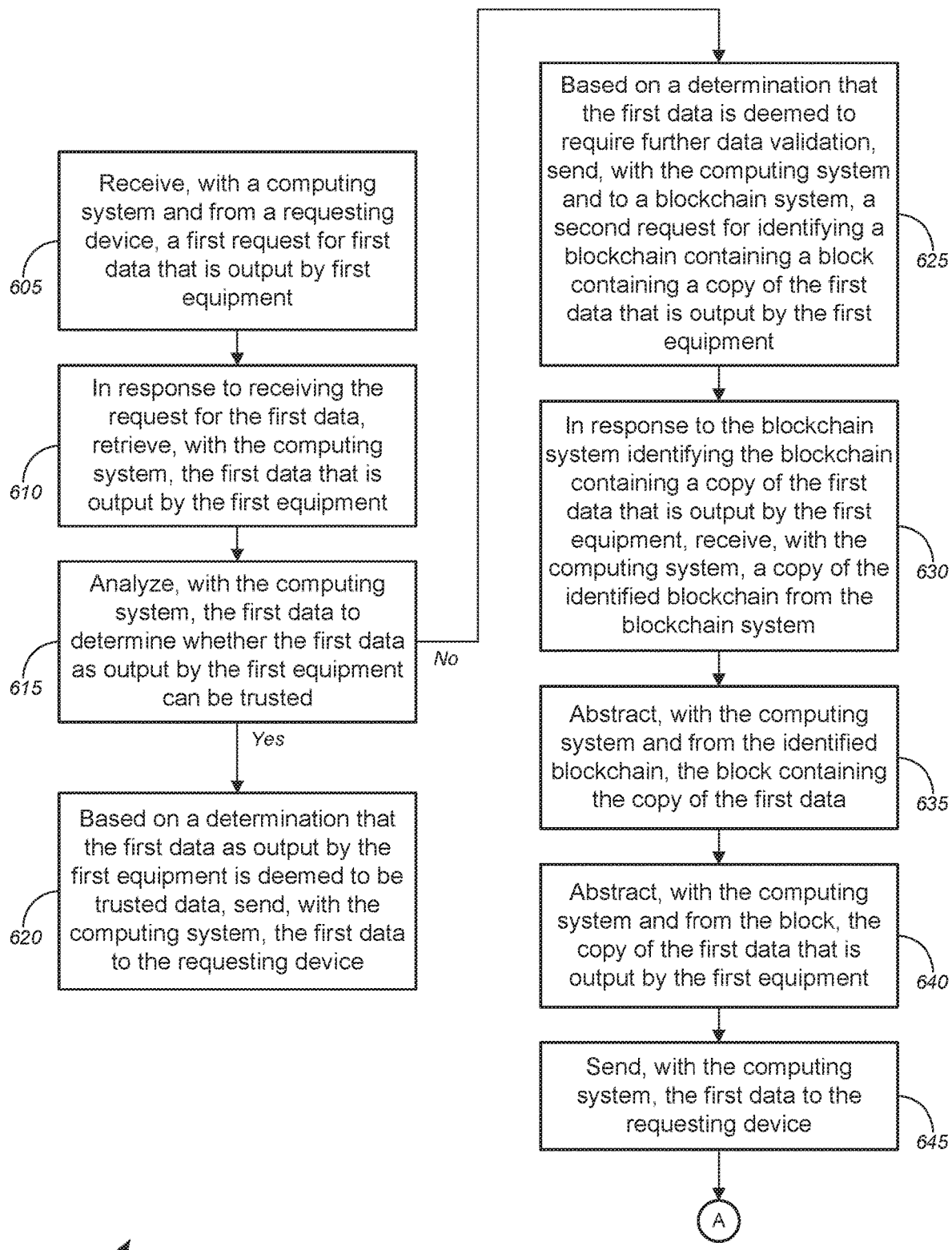
FIGS. 6A and 6B are flow diagrams illustrating a method for utilizing blockchains to implement data and source validation for equipment output data and/or for equipment failure prediction, in accordance with various embodiments.
Figure 6B:
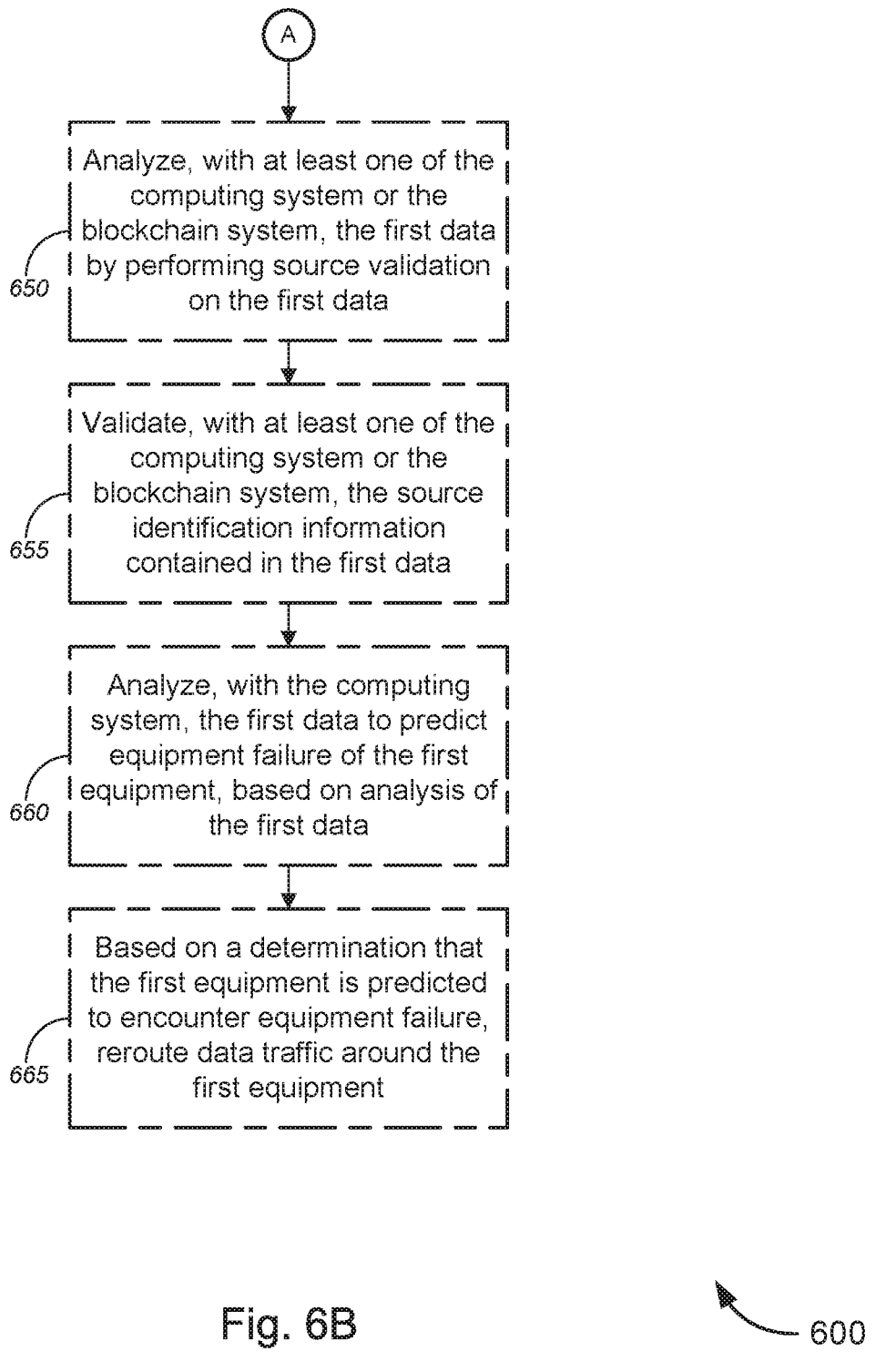
Figure 7:
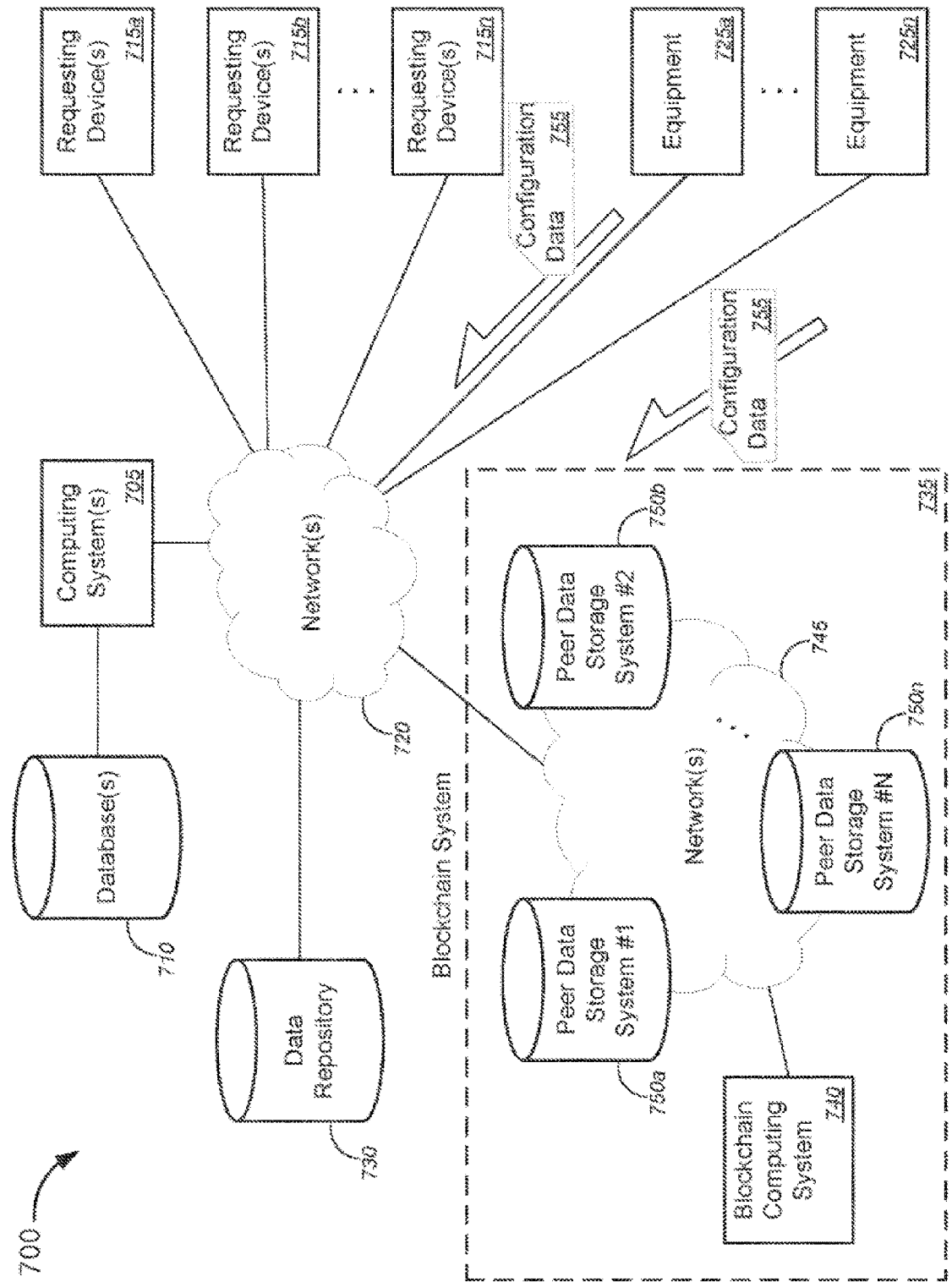
FIG. 7 is a schematic diagram illustrating a system for utilizing the immutable ledger functionality of blockchains to track and/or store equipment configuration data, in accordance with various embodiments.

FIGS. 6A and 6B (collectively, "FIG. 6") are flow diagrams illustrating a method 600 for utilizing blockchains to implement named data networking, in accordance with various embodiments. Method 600 of FIG. 6A continues onto FIG. 6B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems, examples, or embodiments 100, 200, 300, 400, 400', and 500 of FIGS. 1, 2, 3, 4A, 4B, and 5, respectively (or components thereof), such methods may also be implemented using any suitable hardware (or software) implementation. Similarly, while each of the systems, examples, or embodiments 100, 200, 300, 400, 400', and 500 of FIGS. 1, 2, 3, 4A, 4B, and 5, respectively (or components thereof), can operate according to the method 600 illustrated by FIG. 6 (e.g., by executing instructions embodied on a computer readable medium), the systems, examples, or embodiments 100, 200, 300, 400, 400', and 500 of FIGS. 1, 2, 3, 4A, 4B, and 5 can each also operate according to other modes of operation and/or perform other suitable procedures.

In the non-limiting embodiment of FIG. 6A, method 600, at block 605, might comprise receiving, with a computing system and from a requesting device, a first request for first data that is output by first equipment. In some embodiments, the computing system might include, without limitation, one of a data collection system, a real-time processing system, an artificial intelligence ("AI") system, a data dissemination system, a named data system, a server computer, a cloud-based computing system over a network, or a distributed computing system, and/or the like. In some cases, the requesting device might include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, where the first equipment might include, without limitation, one of an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual network device, a virtual router, a server, or a virtual customer interaction data collection system, and/or the like.

At block 610, method 600 might comprise, in response to receiving the first request for the first data, retrieving, with the computing system, the first data that is output by the first equipment. Method 600 might further comprise analyzing, with the computing system, the first data to determine whether the first data as output by the first equipment can be trusted (block 615). If so, method 600 might continue to the process at block 620. If not, the method 600 might proceed to the process at block 625. At block 620, method 600 might comprise, based on a determination that the first data as output by the first equipment is deemed to be trusted data, sending, with the computing system, the first data to the requesting device.

At block 625, method 600 might comprise, based on a determination that the first data is deemed to require further data validation, sending, with the computing system and to a blockchain system, a second request for identifying a blockchain containing a block containing a copy of the first data that is output by the first equipment. Method 600 might further comprise, in response to the blockchain system identifying a blockchain containing a block containing data responsive to the received first request, performing the following: receiving, with the computing system, a copy of the identified blockchain from the blockchain system (block 630); abstracting, with the computing system and from the identified blockchain, the block containing the copy of the first data (block 635); abstracting, with the computing system and from the block, the copy of the first data that is output by the first equipment (block 640); and sending, with the computing system, the first data to the requesting device (block 645). Method 600 might continue onto the process at optional block 650 in FIG. 6B following the circular marker denoted, "A."

At optional block 650 in FIG. 6B (following the circular marker denoted, "A"), method 600 might comprise analyzing, with at least one of the computing system or the blockchain system, the first data by performing source validation on the first data. In some cases, the first data might comprise source identification information, where performing source validation on the first data (at optional block 650) might comprise validating, with at least one of the computing system or the blockchain system, the source identification information contained in the first data (optional block 655).

According to some embodiments, method 600 might further comprise, at optional block 660, analyzing, with the computing system, the first data to predict equipment failure of the first equipment, based on analysis of the first data. In some cases, the first data might include, without limitation, at least one of a status of the first equipment, a change in status of the first equipment, or one or more alerts output by the first equipment, and/or the like. In some instances, the first data might further include, but is not limited to, at least one of a source identifier, a date and time stamp associated with each of at least one of the status of the first equipment, the change in status of the first equipment, or the one or more alerts output by the first equipment, and/or the like. At block 665, method 600 might comprise, based on a determination that the first equipment is predicted to encounter equipment failure, reroute data traffic around the first equipment.

In some embodiments, analyzing the first data to determine whether the first data as output by the first equipment can be trusted (at block 615) might comprise analyzing, with the computing system, the first data in real-time or near-real-time (not shown in FIG. 6). In some cases, the first data might comprise at least one of one or more portions of a log of interactions between a user and a service provider, data communicated by third party service provider systems, data communicated by public service systems, or public data, and/or the like. In some instances, the interactions between the user and the service provider might include, without limitation, at least one of online chats, text messages, telephone conversations, e-mail communications, software application usage, or service provider website interaction by the user, and/or the like. In some cases, the public data might include, but is not limited to, at least one of weather data, stock data, news data, or street traffic data, and/or the like.

In some embodiments, sending the first data to the requesting device (at block 620) might comprise retrieving the first data that is stored in the cache and sending the retrieved first data to the requesting device (not shown in FIG. 6). According to some embodiments, the computing system might first perform verification or authentication tests, including, but not limited to, tests based on time to live ("TTL") analysis to determine timestamps indicating when such data was stored in the cache and to determine what such data's TTL might be (e.g., 1 hour, 1 day, 1 week, 1 month, etc.). Based on a determination that such data was stored for a period exceeding its TTL, then such data may be considered to be untrustworthy (and thus might send the second request to the blockchain system, as described in detail above). On the other hand, based on a determination that such data was stored for a period within its TTL, then the computing system might consider such data to be trustworthy, and might proceed to retrieve the data from the cache and might send the retrieved data to the requesting device.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system and to the blockchain system, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

FIG. 7 is a schematic diagram illustrating a system 700 for utilizing the immutable ledger functionality of blockchains to track and/or store equipment configuration data, in accordance with various embodiments.

In the non-limiting embodiment of FIG. 7, system 700 might comprise computing system(s) 705 and corresponding database(s) 710. In some embodiments, the computing system(s) 705 might include, without limitation, one of a data dissemination system, a named data system, a data collection system, a real-time processing system, an artificial intelligence ("AI") system, a data dissemination system, a named data system, a server computer, a cloud-based computing system over a network, or a distributed computing system, and/or the like. System 700 might further comprise one or more client or requesting devices 715a-715n (collectively, "client devices 715" or "requesting devices 715" or the like), one or more networks 720, one or more equipment 725a-725n (collectively, "equipment 725" or the like), one or more caches or data repositories 730, and a blockchain system 735. In some cases, the one or more requesting devices 715 might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. The network(s) 720 might communicatively couple together the computing system(s) 705, the requesting device(s) 715, the equipment 725, the cache(s) or data repository(ies) 730, and the blockchain system 735.

According to some embodiments, first equipment (i.e., at least one of first equipment 725a-725n, or the like) might be a physical device, where the first equipment might include, without limitation, one of a compute node, an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual compute node, a virtual network device, a virtual router, a virtual server, or a virtual customer interaction data collection system, and/or the like. In some cases, the cache(s) or data repository(ies) 730 might comprise a central data repository or might alternatively comprise a distributed data repository system that stores system configuration data (such as the first configuration data 755 described below, or the like). In some instances, the cache(s) or data repository(ies) 730 might also serve as a command acceptance system that receives commands from users regarding access and/or storage of the system configuration data, or the like.

In some embodiments, the blockchain system 735 might comprise a blockchain computing system 740, one or more networks 745, and peer data storage systems #1 through #N 750a-750n (collectively, "peer data storage systems 750," "distributed peer data storage systems 750," or the like), the blockchain computing system 740 and the peer data storage systems 750 being communicatively coupled to each other via network(s) 745. Each instance of a blockchain containing a plurality of blocks might be stored in two or more of the plurality of peer data storage systems 750a-750n. A non-limiting example of a blockchain (which might include hash values and such, not shown) can be seen in the embodiment of FIG. 2, which is described above. According to some embodiments, data of a block and hash value of a previous block in the blockchain might be encrypted to produce a hash value, using a cryptographic hash function including, without limitation, one of secure hash algorithm-7 ("SHA-7") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

According to some embodiments, the network(s) 720 and/or 745 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol (e.g., LTE protocol, 5G protocol, LoRa protocol, etc.); and/or any combination of these and/or other networks. In a particular embodiment, the network(s) 720 and/or 745 might include an access network of the service provider (e.g., an Internet service provider ("ISP")). In another embodiment, the network(s) 720 and/or 745 might include a core network of the service provider, and/or the Internet.

In operation, computing system 705 might receive, from a requesting device (i.e., one of requesting devices 715a-715n, or the like), a first request for first configuration data 755 that is output by first equipment (i.e., one of equipment 725a-725n, or the like), the first configuration data 755 being used to configure operation of the first equipment. The computing system 705 might determine whether data repository 730 that is communicatively coupled to the computing system 705 (in this case, via network(s) 720, or the like) contains the first configuration data 755 that is responsive to the received first request. Based on a determination that the data repository 730 contains the first configuration data 755 that is responsive to the received first request, the computing system 705 might retrieve the first configuration data 755 that is responsive to the received first request, and might send the retrieved first configuration data 755 to the requesting device. Based on a determination that the data repository does not contain the first configuration data 755 that is responsive to the received first request, the computing system 705 might send, to blockchain system 735, a second request for identifying a blockchain containing a block containing the first configuration 755 data responsive to the received first request.

In response to the blockchain system 735 identifying a blockchain containing a block containing the first configuration data 755 responsive to the received first request, the computing system might: receive a copy of the identified blockchain from the blockchain system 735; abstract, from the identified blockchain, the block containing the first configuration data 755 responsive to the received first request; abstract, from the identified block, the first configuration data 755 responsive to the received first request; and send the first configuration data 755 to the requesting device.

According to some embodiments, the first configuration data 755 might comprise second configuration data including, but not limited to, at least one of basic input/output system ("BIOS") configuration data, storage configuration data, specialty card configuration data, security configuration data, operating system ("OS") configuration data, device driver configuration data, firmware configuration data, programming language translation configuration data, system utility configuration data, network configuration data, router configuration data, host configuration data, software configuration data, power configuration data, extensible firmware interface ("EFI") configuration data, or EFI system partition ("ESP") configuration data, and/or the like.

In some embodiments, the first configuration data 755 might further comprise third configuration data including, without limitation, at least one of information regarding who created the second configuration data, information regarding who updated the second configuration data, information regarding who changed the second configuration data, information regarding who has accessed the second configuration data, information regarding requesting devices, information regarding when the second configuration data was created, information regarding when the second configuration data was updated, information regarding when the second configuration data was changed, information regarding when the second configuration data was accessed, or geospatial data of requesting devices, and/or the like. In some instances, the first configuration data 755 might further comprise a unique identifier ("UID") associated with one of the first equipment or the first configuration data.

According to some embodiments, the first equipment might send fourth configuration data 755 to blockchain system 735 (in some cases, as beacon data or the like) either periodically or in response to at least one of the fourth configuration data 755 being created, the fourth configuration data 755 being updated, the fourth configuration data 755 being changed, the first equipment being configured with the fourth configuration data 755, configuration of the first equipment being modified using the fourth configuration data 755, or configuration of the first equipment being changed using the fourth configuration data 755. The blockchain system might generate a block of a blockchain by incorporating the fourth configuration data 755 into the block and might validate the generated block. The blockchain containing the generated block may be stored in data repository 730. In some embodiments, the fourth configuration data 755 might be similar to the first configuration data 755.

In some embodiments, the equipment 725*a*-725*n* might each digitally sign each configuration data 755 being sent to the data repository 730 and/or to the blockchain system 735, in some cases, using a private key that is based on the media access control ("MAC") address of the equipment signing the configuration data. A public key corresponding to the private key may be used by the data repository 730 and/or the blockchain system 735 to verify the digital signature. This might serve as an additional layer of trust or validation.

According to some embodiments, the configuration data 755 of FIG. 7 might correspond to the data referred to with respect to FIGS. 2-4 described above. For example, when stored in a block of the blockchain, the configuration data 755 might correspond to one or more of the data fields 220 of one of the blocks 210 of FIG. 2, or the like. Alternatively, while data collection system 305 of FIG. 3 might determine whether data lake 310 contains configuration data 755 received from equipment (e.g., at least one of the one or more optical equipment 315, the one or more routers 320, the one or more servers 325, the one or more VMs 330, the one or more customer interaction systems 335, or other internal network system 340, and/or at least one of the one or more partner systems 345, the one or more public systems 350, the one or more public data systems 355, or other external network system 360, and/or the like) that can be trusted. If so, in response to a request for such configuration data, data collection system 305 might retrieve the trusted configuration data 755 from the data lake 310 (which might correspond to data repository 730 of FIG. 7, or the like). Based on a determination that the data lake 310 does not contain data that is responsive to the received request and/or based on a determination that data that is stored in the data lake 310 and that is responsive to the received request cannot be trusted, the data collection system 305 might send a request to the blockchain system 365 to identify a block that contains the requested configuration data 755 (in a manner described above with respect to FIGS. 3 and 7). Data and source validation as described above with respect to FIG. 3 may also be implemented. In some cases, the data described above with respect to FIG. 4 might comprise the configuration data 755, and the process of data retrieval and/or data and source validation of FIG. 4 may be implemented for configuration data 755.

In some aspects, the various embodiments might provide a more secure computing infrastructure using mechanics from verifiable ledger-type validation, signing, or trust, etc., with machine configuration details where machines (including, but not limited to, servers, switches, IoT devices, or the like) act more like a set-top box ("STB") to actually request their configuration from a central server. The computing infrastructure is further made secure by the distributed nature of the blockchain system 735. In particular, copies of the blockchain are stored in two or more of the peer data storage systems 750*a*-750*n*, and any of these copies of the blockchain may be compared with the other copies stored in the peer data storage systems 750 to ensure immutability of the blockchain. For a private blockchain system (such as blockchain system 735), using a proof-of-stake system, the distribution of the copies of the blockchain provides further security over a traditional centralized, secured database, which, if compromised, may lead to compromised or altered data and/or privacy, or the like. In some embodiments, data repository 730 might be a centralized server (e.g., centralized Redfish server, or the like) that deprecates use of insecure systems (e.g., intelligent platform management interface ("IPMI"), or the like) while using a more STB-like check-in with a Redfish-type deployment to a server or switch with information on where to secure boot (e.g., using pre-boot execution environment ("PXE"), or the like) from an image to come online or to become part of a compute infrastructure with a current configuration making it ready for discovery and service before being re-imaged by changes in a centralized server where customer attributes may be updated when the resource is consumed and needs new configuration applied (like configuration data 755, or the like).

These and other functionalities of the various embodiments are described in detail below with respect to FIGS. 8A and 8B.

Figure 8A:
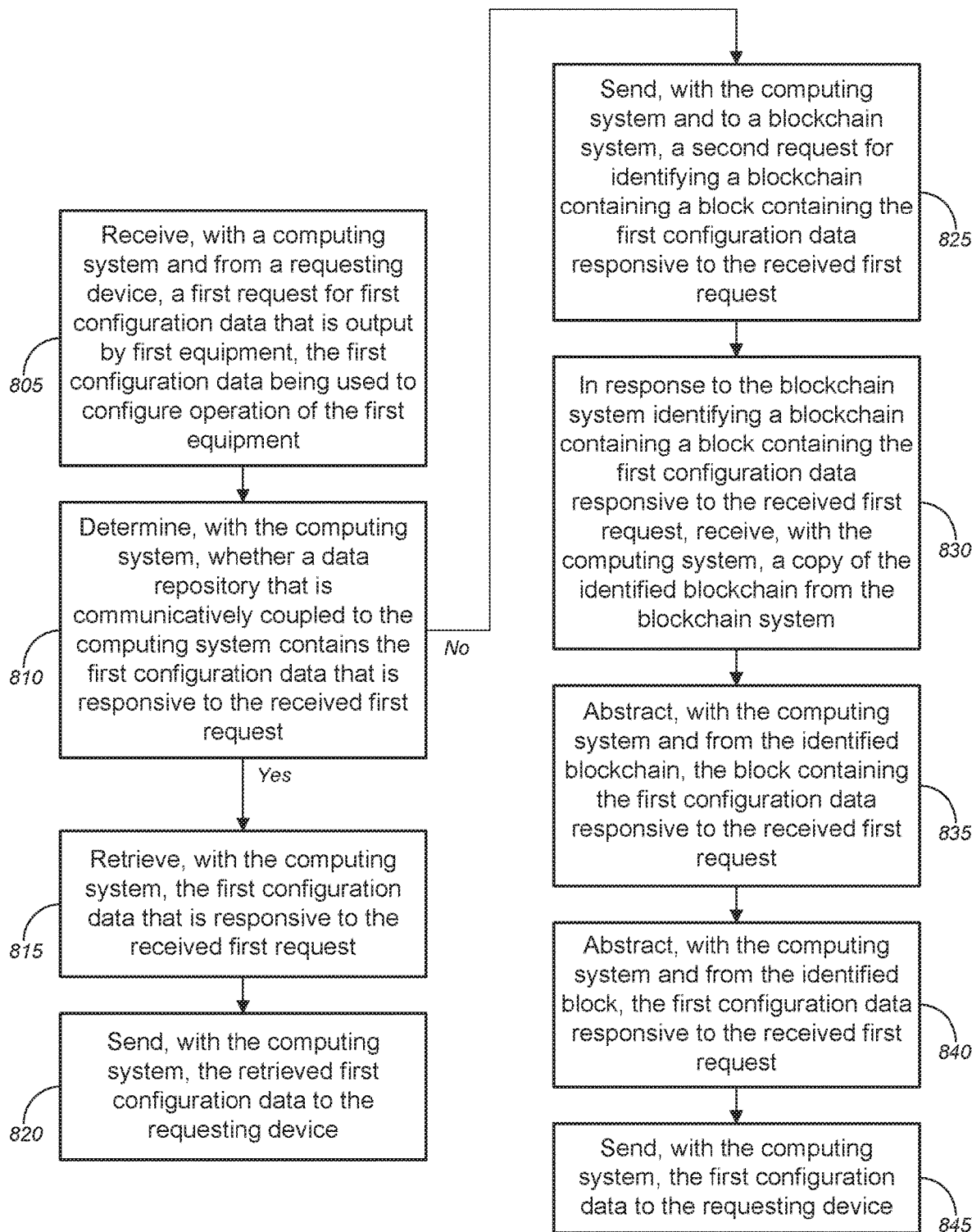
FIGS. 8A and 8B are flow diagrams illustrating a method for utilizing the immutable ledger functionality of blockchains to track and/or store equipment configuration data, in accordance with various embodiments.
Figure 8B:
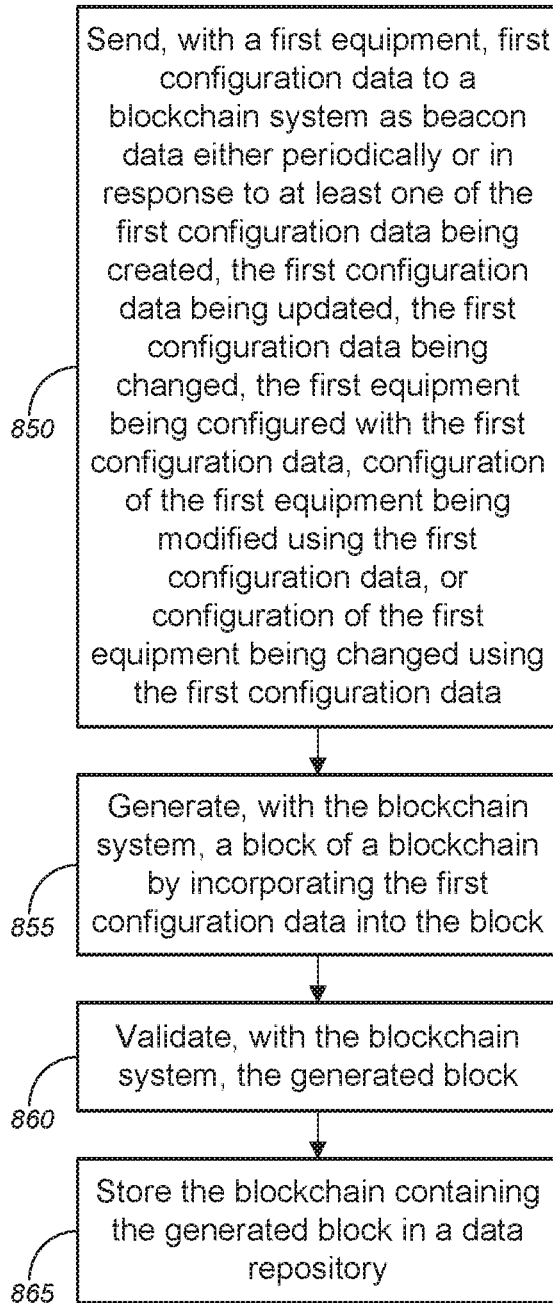

FIGS. 8A and 8B (collectively, "FIG. 8") are flow diagrams illustrating a method 800 for utilizing the immutable ledger functionality of blockchains to track and/or store equipment configuration data, in accordance with various embodiments.

While the techniques and procedures are depicted and/or described in a certain order for purposes of illustration, it should be appreciated that certain procedures may be reordered and/or omitted within the scope of various embodiments. Moreover, while the method 800 illustrated by FIG. 8 can be implemented by or with (and, in some cases, are described below with respect to) the systems, examples, or embodiments 100, 200, 300, 400, 400', 500, and 700 of FIGS. 1, 2, 3, 4A, 4B, 5, and 7, respectively (or components thereof), such methods may also be implemented using any suitable hardware (or software) implementation. Similarly, while each of the systems, examples, or embodiments 100, 200, 300, 400, 400', 500, and 700 of FIGS. 1, 2, 3, 4A, 4B, 5, and 7, respectively (or components thereof), can operate according to the method 800 illustrated by FIG. 8 (e.g., by executing instructions embodied on a computer readable medium), the systems, examples, or embodiments 100, 200, 300, 400, 400', 500, and 700 of FIGS. 1, 2, 3, 4A, 4B, 5, and 7 can each also operate according to other modes of operation and/or perform other suitable procedures.

In the non-limiting embodiment of FIG. 8A, method 800, at block 805, might comprise receiving, with a computing system and from a requesting device, a first request for first configuration data that is output by first equipment, the first configuration data being used to configure operation of the first equipment.

In some embodiments, the computing system might include, but is not limited to, one of a data dissemination system, a named data system, a data collection system, a real-time processing system, an artificial intelligence ("AI") system, a server computer, a cloud-based computing system over a network, or a distributed computing system, and/or the like. In some cases, the requesting device might include, without limitation, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, the first equipment might be a physical device, wherein the first equipment might include, but is not limited to, one of a compute node, an optical network device, a router, a server, an Internet of Things ("IoT") sensor, an IoT actuator, or a customer interaction data collection system, and/or the like. Alternatively, or additionally, the first equipment might be a virtual device, wherein the first equipment might include, without limitation, one of a virtual compute node, a virtual network device, a virtual router, a virtual server, or a virtual customer interaction data collection system, and/or the like.

Merely by way of example, in some cases, the first configuration data might comprise second configuration data including, but not limited to, at least one of basic input/output system ("BIOS") configuration data, storage configuration data, specialty card configuration data, security configuration data, operating system ("OS") configuration data, device driver configuration data, firmware configuration data, programming language translation configuration data, system utility configuration data, network configuration data, router configuration data, host configuration data, software configuration data, power configuration data, extensible firmware interface ("EFI") configuration data, or EFI system partition ("ESP") configuration data, and/or the like.

In some instances, the first configuration data might further comprise third configuration data including, without limitation, at least one of information regarding who created the second configuration data, information regarding who updated the second configuration data, information regarding who changed the second configuration data, information regarding who has accessed the second configuration data, information regarding requesting devices, information regarding when the second configuration data was created, information regarding when the second configuration data was updated, information regarding when the second configuration data was changed, information regarding when the second configuration data was accessed, or geospatial data of requesting devices, and/or the like. In some cases, the first configuration data might further comprise a unique identifier ("UID") associated with one of the first equipment or the first configuration data.

At block 810, method 800 might comprise determining, with the computing system, whether a data repository that is communicatively coupled to the computing system contains the first configuration data that is responsive to the received first request. If so, method 800 might continue to the process at block 815. If not, the method 800 might proceed to the process at block 825. At block 815, method 800 might comprise retrieving, with the computing system, the first configuration data that is responsive to the received first request, and sending, with the computing system, the retrieved first configuration data to the requesting device (block 820).

At block 825, method 800 might comprise, based on a determination that the data repository does not contain the first configuration data that is responsive to the received first request, sending, with the computing system and to a blockchain system, a second request for identifying a blockchain containing a block containing the first configuration data responsive to the received first request. In response to the blockchain system identifying a blockchain containing a block containing the first configuration data responsive to the received first request, the method 800 might further comprise: receiving, with the computing system, a copy of the identified blockchain from the blockchain system (block 830); abstracting, with the computing system and from the identified blockchain, the block containing the first configuration data responsive to the received first request (block 835); abstracting, with the computing system and from the identified block, the first configuration data responsive to the received first request (block 840); and sending, with the computing system, the first configuration data to the requesting device (block 845).

With reference to FIG. 8B, method 800 might comprise, at block 850, sending, with a first equipment, first configuration data to a blockchain system (in some cases, as beacon data) either periodically or in response to at least one of the first configuration data being created, the first configuration data being updated, the first configuration data being changed, the first equipment being configured with the first configuration data, configuration of the first equipment being modified using the first configuration data, or configuration of the first equipment being changed using the first configuration data, and/or the like. At block 855, method 800 might comprise generating, with the blockchain system, a block of a blockchain by incorporating the first configuration data into the block. Method 800 might further comprise validating, with the blockchain system, the generated block (block 860). Method 800 might further comprise, at block 865, storing the blockchain containing the generated block in a data repository.

Exemplary System and Hardware Implementation

Figure 9:
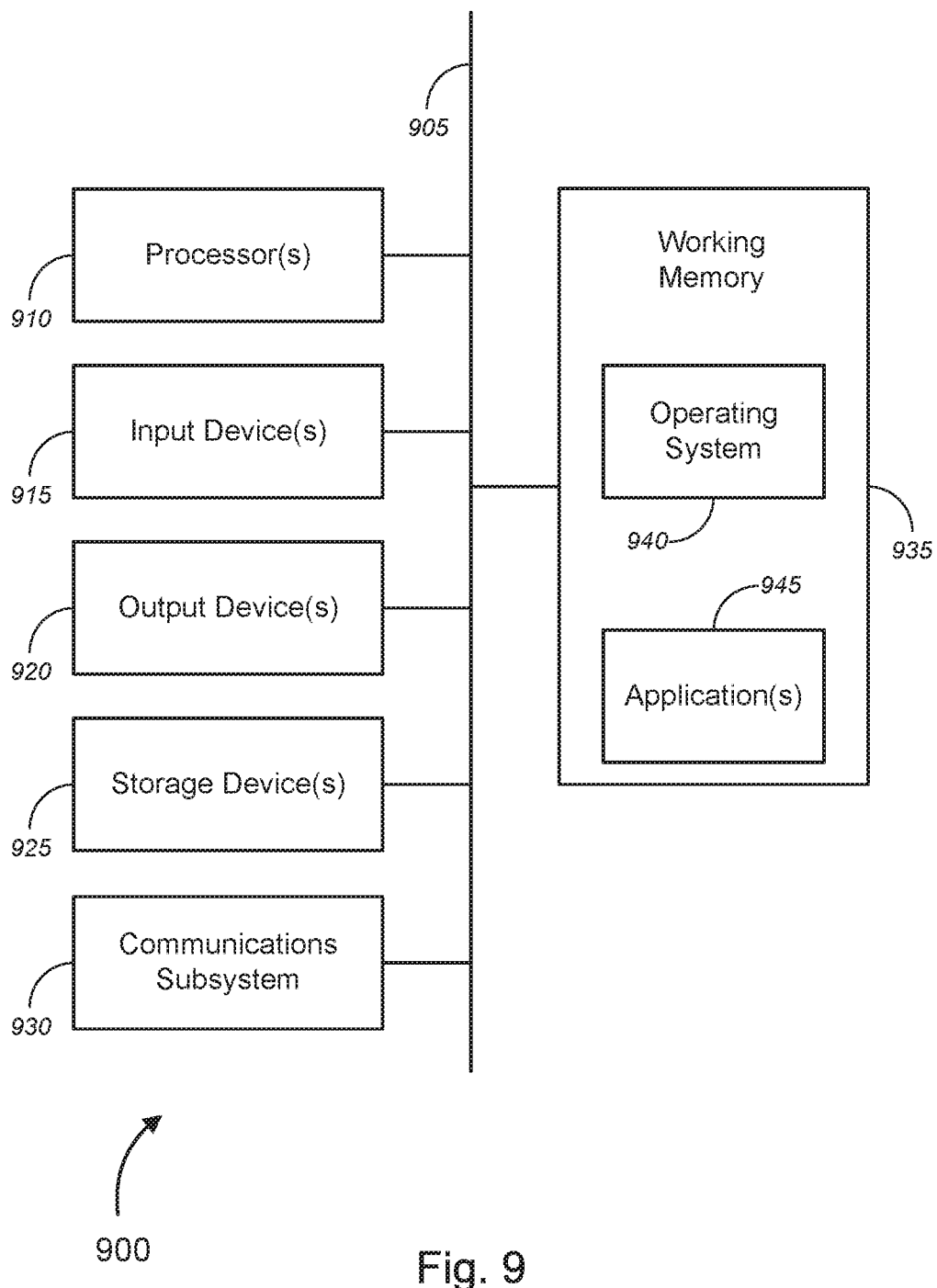
FIG. 9 is a block diagram illustrating an exemplary computer or system hardware architecture, in accordance with various embodiments.

FIG. 9 is a block diagram illustrating an exemplary computer or system hardware architecture, in accordance with various embodiments. FIG. 9 provides a schematic illustration of one embodiment of a computer system 900 of the service provider system hardware that can perform the methods provided by various other embodiments, as described herein, and/or can perform the functions of computer or hardware system (i.e., computing systems 105, 375, and 705, requesting devices 115a-115n, 405a-405n, and 715a-715n, equipment 125a-125n and 725a-725n, blockchain systems 135, 365, 440, 440', 505, and 735, blockchain computing systems 140 and 740, data collection system 305, data dissemination systems ("DDSs") 410a-410n and 520, decentralized applications ("DApps") 435a-435f, Client Port Domain Name System ("DNS") 530, client devices(s) 535, etc.), as described above. It should be noted that FIG. 9 is meant only to provide a generalized illustration of various components, of which one or more (or none) of each may be utilized as appropriate. FIG. 9, therefore, broadly illustrates how individual system elements may be implemented in a relatively separated or relatively more integrated manner.

The computer or hardware system 900—which might represent an embodiment of the computer or hardware system (i.e., computing systems 105, 375, and 705, requesting devices 115a-115n, 405a-405n, and 715a-715n, equipment 125a-125n and 725a-725n, blockchain systems 135, 365, 440, 440', 505, and 735, blockchain computing systems 140 and 740, data collection system 305, DDSs 410a-410n and 520, DApps 435a-435f, Client Port DNS 530, client device(s) 535, etc.), described above with respect to FIGS. 1-8—is shown comprising hardware elements that can be electrically coupled via a bus 905 (or may otherwise be in communication, as appropriate). The hardware elements may include one or more processors 910, including, without limitation, one or more general-purpose processors and/or one or more special-purpose processors (such as microprocessors, digital signal processing chips, graphics acceleration processors, and/or the like); one or more input devices 915, which can include, without limitation, a mouse, a keyboard, and/or the like; and one or more output devices 920, which can include, without limitation, a display device, a printer, and/or the like.

The computer or hardware system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 900 might also include a communications subsystem 930, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 930 may permit data to be exchanged with a network (such as the network described below, to name one example), with other computer or hardware systems, and/or with any other devices described herein. In many embodiments, the computer or hardware system 900 will further comprise a working memory 935, which can include a RAM or ROM device, as described above.

The computer or hardware system 900 also may comprise software elements, shown as being currently located within the working memory 935, including an operating system 940, device drivers, executable libraries, and/or other code, such as one or more application programs 945, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 900 and/or might take the form of source and/or installable code, which, upon compilation and/or installation on the computer or hardware system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 900) to perform methods in accordance with various embodiments of the invention. According to a set of embodiments, some or all of the procedures of such methods are performed by the computer or hardware system 900 in response to processor 910 executing one or more sequences of one or more instructions (which might be incorporated into the operating system 940 and/or other code, such as an application program 945) contained in the working memory 935. Such instructions may be read into the working memory 935 from another computer readable medium, such as one or more of the storage device(s) 925. Merely by way of example, execution of the sequences of instructions contained in the working memory 935 might cause the processor(s) 910 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 900, various computer readable media might be involved in providing instructions/code to processor(s) 910 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 925. Volatile media includes, without limitation, dynamic memory, such as the working memory 935. In some alternative embodiments, a computer readable medium may take the form of transmission media, which includes, without limitation, coaxial cables, copper wire, and fiber optics, including the wires that comprise the bus 905, as well as the various components of the communication subsystem 930 (and/or the media by which the communications subsystem 930 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 900. These signals, which might be in the form of electromagnetic signals, acoustic signals, optical signals, and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

Figure 10:
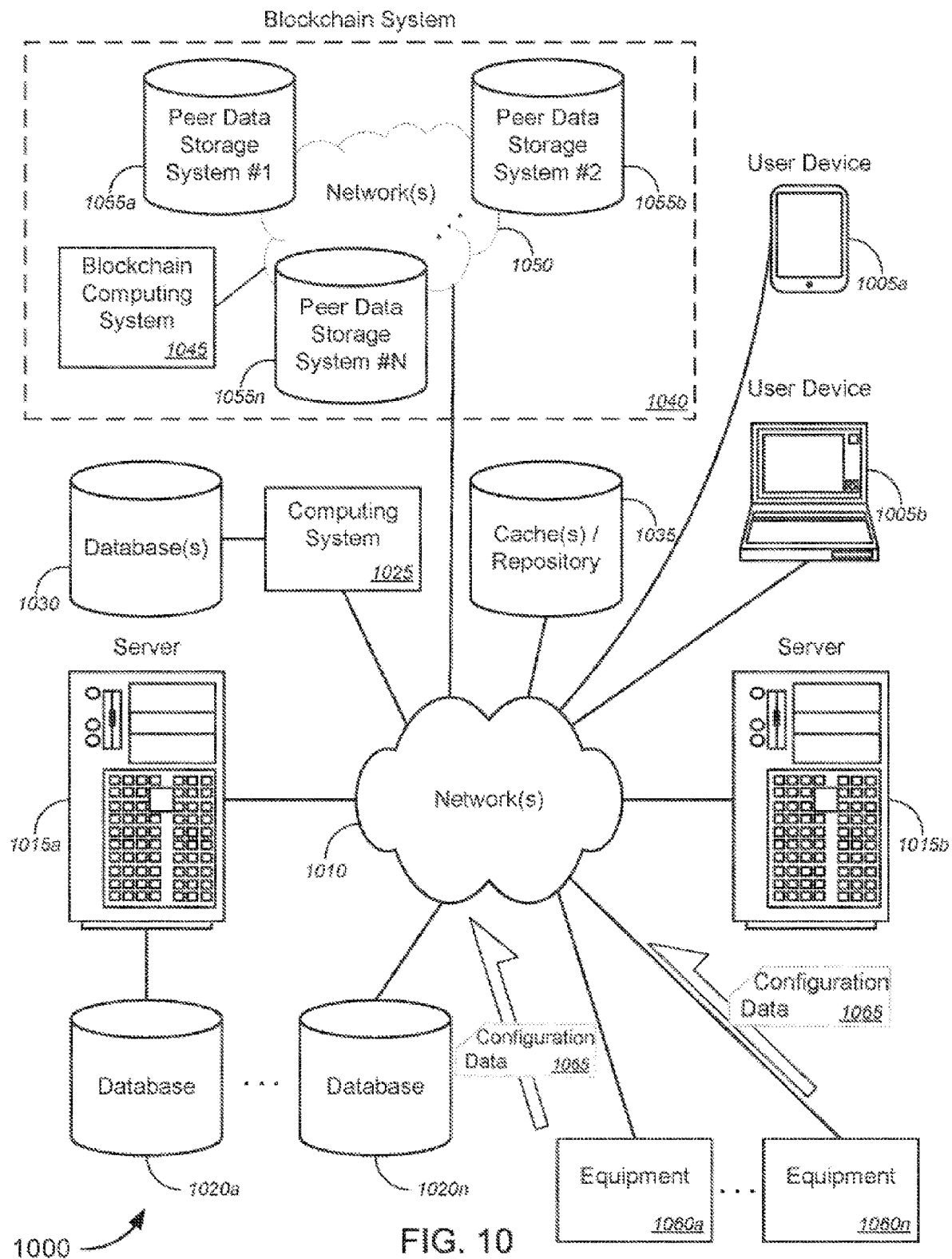
FIG. 10 is a block diagram illustrating a networked system of computers, computing systems, or system hardware architecture, which can be used in accordance with various embodiments.

As noted above, a set of embodiments comprises methods and systems for implementing equipment output data validation or equipment failure prediction, and, more particularly, to methods, systems, and apparatuses for utilizing blockchains to implement data and source validation for equipment output data and/or for equipment failure predict. The set of embodiments also comprises methods and systems for implementing tracking or storing of equipment configuration data, and, more particularly, to methods, systems, and apparatuses for utilizing the immutable ledger functionality of blockchains to track and/or store equipment configuration data. FIG. 10 illustrates a schematic diagram of a system 1000 that can be used in accordance with one set of embodiments. The system 1000 can include one or more user computers, user devices, or customer devices 1005. A user computer, user device, or customer device 1005 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1005 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1005 can be any other electronic device, such as a thin-client computer, Internet-enabled mobile telephone, and/or personal digital assistant, capable of communicating via a network (e.g., the network(s) 1010 described below) and/or of displaying and navigating web pages or other types of electronic documents. Although the exemplary system 1000 is shown with two user computers, user devices, or customer devices 1005, any number of user computers, user devices, or customer devices can be supported.

Certain embodiments operate in a networked environment, which can include a network(s) 1010. The network(s) 1010 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1010 (similar to network(s) 120, 145, 450, 515, 720, and 745 of FIGS. 1, 4, 5, and 7, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol (e.g., LTE protocol, 5G protocol, LoRa protocol, etc.); and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1015. Each of the server computers 1015 may be configured with an operating system, including, without limitation, any of those discussed above, as well as any commercially (or freely) available server operating systems. Each of the servers 1015 may also be running one or more applications, which can be configured to provide services to one or more clients 1005 and/or other servers 1015.

Merely by way of example, one of the servers 1015 might be a data server, a web server, a cloud computing device(s), or the like, as described above. The data server might include (or be in communication with) a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one or more application servers, which can be configured with one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1005 and/or another server 1015. In some embodiments, an application server can perform one or more of the processes for implementing equipment output data validation or equipment failure prediction, and, more particularly, to methods, systems, and apparatuses for utilizing blockchains to implement data and source validation for equipment output data and/or for equipment failure predict and/or for implementing tracking or storing of equipment configuration data, and, more particularly, to methods, systems, and apparatuses for utilizing the immutable ledger functionality of blockchains to track and/or store equipment configuration data, as described in detail above. Data provided by an application server may be formatted as one or more web pages (comprising HTML, JavaScript, etc., for example) and/or may be forwarded to a user computer 1005 via a web server (as described above, for example). Similarly, a web server might receive web page requests and/or input data from a user computer 1005 and/or forward the web page requests and/or input data to an application server. In some cases, a web server may be integrated with an application server.

In accordance with further embodiments, one or more servers 1015 can function as a file server and/or can include one or more of the files (e.g., application code, data files, etc.) necessary to implement various disclosed methods, incorporated by an application running on a user computer 1005 and/or another server 1015. Alternatively, as those skilled in the art will appreciate, a file server can include all necessary files, allowing such an application to be invoked remotely by a user computer, user device, or customer device 1005 and/or server 1015.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020*a*-1020*n* (collectively, "databases 1020"). The location of each of the databases 1020 is discretionary: merely by way of example, a database 1020*a* might reside on a storage medium local to (and/or resident in) a server 1015*a* (and/or a user computer, user device, or customer device 1005). Alternatively, a database 1020*n* can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, the database 1020 can be a relational database, such as an Oracle database, that is adapted to store, update, and retrieve data in response to SQL-formatted commands. The database might be controlled and/or maintained by a database server, as described above, for example.

According to some embodiments, system 1000 might further comprise a computing system 1025 and corresponding database(s) 1030 (similar to computing systems 105, 375, and 705 and corresponding database(s) 110, 310, and 710 of FIGS. 1, 3, and 7, or the like). System 1000 might further comprise cache(s) and/or data repository(ies) 1035 (similar to cache(s) or data repository(ies) 130, 415, 525, and 730 or data lake 310 of FIGS. 1, 3, 4, 5, and 7, or the like). System 1000 might further comprise a blockchain system 1040 (similar to blockchain systems 135, 365, 440, 440', 505, and 735 of FIGS. 1, 3, 4, 5, and 7, or the like), which might comprise a blockchain computing system 1045 (similar to blockchain systems 135, 365, 440, 440', 505, and 735 of FIGS. 1, 3, 4, 5, and 7, or the like), one or more peer data storage systems #1-#N 1055*a*-1055*n* (collectively, "peer data storage systems 1055" or the like; similar to peer data storage systems 150*a*-150*n* of FIG. 1, or the like), and network(s) 1050 (similar to networks 145, 450, 515, and 745 of FIGS. 1, 4, 5, and 7, or the like). System 1000 might further comprise equipment 1060*a*-1060*n* (collectively, "equipment 1060" or the like; similar to equipment 125*a*-125*n* and 725*a*-725*n* of FIG. 7, or the like).

In operation, computing system 1025 might receive a first request for data that is output by first equipment (e.g., at least one of equipment 1060, or the like) from a user via a requesting device (i.e., one of the requesting devices or user devices 1005*a* or 1005*b*, or the like), might determine whether a cache (e.g., cache(s) 1035, or the like) that is communicatively coupled to the computing system 1025 (via network(s) 1010) contains data that is responsive to the received first request (e.g., data that is output by first equipment, or the like). In some embodiments, the computing system 1025 might also determine whether such data that is responsive to the received first request (i.e., data that is output by the first equipment, etc.) can be trusted. Based on a determination that the cache(s) 1035 contains data that is responsive to the received first request and based on a determination that such data (which includes data as output by first equipment) can be trusted, computing system 1025 might retrieve the data that is responsive to the received first request, and might send the retrieved data to the requesting device. On the other hand, based on a determination that the cache does not contain data that is responsive to the received first request and/or based on a determination that data that is stored in the cache(s) 1035 and that is responsive to the received first request cannot be trusted, computing system 1025 might send, to a blockchain system (e.g., blockchain system 1040 or blockchain computing system 1045 of blockchain system 1040, or the like), a second request for identifying a blockchain containing a block containing data responsive to the received first request, by identifying a blockchain containing a block containing a copy of the first data that is output by the first equipment.

In response to the blockchain system (e.g., blockchain system 1040 or blockchain computing system 1045 of blockchain system 1040, or the like) identifying a blockchain (such as blockchain 205 of FIG. 2, or the like) containing a block containing data responsive to the received first request, computing system 1025 (or blockchain computing system 1045) might receive a copy of the identified blockchain from the blockchain system; might abstract, from the identified blockchain, the block containing the data responsive to the received first request (i.e., the copy of the data that is output by the first equipment, in this case); might abstract, from the identified block, the data responsive to the received first request (i.e., the copy of the data that is output by the first equipment, in this case); and might send the data (i.e., the data that is output by the first equipment) to the requesting device.

In some embodiments, the computing system 1025 might each include, without limitation, one of a data dissemination system, a named data system, a data collection system, a real-time processing system, an artificial intelligence ("AI") system, a server computer, a cloud-based computing system over a network, or a distributed computing system, and/or the like. In some cases, requesting devices might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, first equipment (i.e., at least one of first equipment 1060a-1060n, or the like) might be a physical device, where the first equipment might include, without limitation, one of a compute node, an optical network device, a router, a server, an Internet of Things ("IoT") sensor, an IoT actuator, or a customer interaction data collection system, and/or the like. Alternatively, the first equipment might be a virtual device, where the first equipment might include, but is not limited to, one of a virtual compute node, a virtual network device, a virtual router, a virtual server, or a virtual customer interaction data collection system, and/or the like.

In some aspects, the computing system 1025, the blockchain system 1040, or the blockchain computing system 1045 might analyze the first data by performing at least one of data validation and/or source validation on the first data. In some cases, the first data might comprise source identification information, where performing source validation on the first data might comprise validating the source identification information contained in the first data. In some embodiments, the computing system 1025 might perform at least one of data validation and/or source validation using a combination of two or more of a real-time processing system, an intelligence system, an intelligence algorithms, and a support systems (which might include, without limitation, business, operations, or development systems, etc.), and/or the like. Data and/or source validation may, in some embodiments, also be performed at cache(s) 1035. In some instances, analyzing the first data might comprise analyzing, with the computing system 1025, the first data in real-time or near-real-time.

Merely by way of example, in some instances, the determination that the first data as output by the first equipment being deemed to be trusted data might be based on a determination that the first data as output by the first equipment is within a predetermined range of threshold values or parameters, where the determination that the first data is deemed to require further data validation might be based on a determination that the first data exceeds the predetermined range of threshold values or parameters.

According to some embodiments, the computing system 1025 might analyze the first data to predict equipment failure of the first equipment, based on analysis of the first data, where the first data might include, without limitation, at least one of a status of the first equipment, a change in status of the first equipment, or one or more alerts output by the first equipment, and/or the like. In some cases, the first data might further include, but is not limited to, at least one of a source identifier, a date and time stamp associated with each of at least one of the status of the first equipment, the change in status of the first equipment, or the one or more alerts output by the first equipment, and/or the like.

In some embodiments, the first data might include, without limitation, at least one of one or more portions of a log of interactions between a user and a service provider, data communicated by third party service provider systems, data communicated by public service systems, or public data, and/or the like. In such cases, the interactions between the user and the service provider might include, but is not limited to, at least one of online chats, text messages, telephone conversations, e-mail communications, software application usage, or service provider website interaction by the user, and/or the like. In some instances, the public data might include, without limitation, at least one of weather data, stock data, news data, or street traffic data, and/or the like.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system 1025 and to the blockchain system 1040, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

In some aspects, alternative to the embodiments described above, computing system 1025 and/or server 1015a or 1015b (collectively, "computing system," or the like) might receive, from a requesting device (i.e., one of user devices 1005a and 1005b, or the like), a third request for first configuration data 1065 that is output by first equipment (i.e., one of equipment 1060a-1060n, or the like), the first configuration data 1065 being used to configure operation of the first equipment. The computing system might determine whether data repository 1035 that is communicatively coupled to the computing system (in this case, via network (s) 1010, or the like) contains the first configuration data 1065 that is responsive to the received third request. Based on a determination that the data repository 1035 contains the first configuration data 1065 that is responsive to the received third request, the computing system might retrieve the first configuration data 1065 that is responsive to the received third request, and might send the retrieved first configuration data 1065 to the requesting device. Based on a determination that the data repository does not contain the first configuration data 1065 that is responsive to the received third request, the computing system might send, to blockchain system 1040, a fourth request for identifying a blockchain containing a block containing the first configuration 1065 data responsive to the received third request.

In response to the blockchain system 1040 identifying a blockchain containing a block containing the first configuration data 1065 responsive to the received third request, the computing system might: receive a copy of the identified blockchain from the blockchain system 1040; abstract, from the identified blockchain, the block containing the first configuration data 1065 responsive to the received third request; abstract, from the identified block, the first configuration data 1065 responsive to the received third request; and send the first configuration data 1065 to the requesting device.

According to some embodiments, the first configuration data 1065 might comprise second configuration data including, but not limited to, at least one of basic input/output system ("BIOS") configuration data, storage configuration data, specialty card configuration data, security configuration data, operating system ("OS") configuration data, device driver configuration data, firmware configuration data, programming language translation configuration data, system utility configuration data, network configuration data, router configuration data, host configuration data, software configuration data, power configuration data, extensible firmware interface ("EFI") configuration data, or EFI system partition ("ESP") configuration data, and/or the like.

In some embodiments, the first configuration data 1065 might further comprise third configuration data including, without limitation, at least one of information regarding who created the second configuration data, information regarding who updated the second configuration data, information regarding who changed the second configuration data, information regarding who has accessed the second configuration data, information regarding requesting devices, information regarding when the second configuration data was created, information regarding when the second configuration data was updated, information regarding when the second configuration data was changed, information regarding when the second configuration data was accessed, or geospatial data of requesting devices, and/or the like. In some instances, the first configuration data 1065 might further comprise a unique identifier ("UID") associated with one of the first equipment or the first configuration data.

According to some embodiments, the first equipment might send fourth configuration data 1065 to blockchain system 1040 (in some cases, as beacon data or the like) either periodically or in response to at least one of the fourth configuration data 1065 being created, the fourth configuration data 1065 being updated, the fourth configuration data 1065 being changed, the first equipment being configured with the fourth configuration data 1065, configuration of the first equipment being modified using the fourth configuration data 1065, or configuration of the first equipment being changed using the fourth configuration data 1065. The blockchain system might generate a block of a blockchain by incorporating the fourth configuration data 1065 into the block and might validate the generated block. The blockchain containing the generated block may be stored in data repository 1035. In some embodiments, the fourth configuration data 1065 might be similar to the first configuration data 1065.

These and other functions of the system 1000 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system and from a requesting device, a first request for first data that is output by first equipment;
   in response to receiving the first request for the first data, retrieving, with the computing system, the first data that is output by the first equipment;
   analyzing, with the computing system, the first data to determine whether the first data as output by the first equipment can be trusted;
   based on a determination that the first data as output by the first equipment is deemed to be trusted data, sending, with the computing system, the first data to the requesting device;
   based on a determination that the first data is deemed to require further data validation, sending, with the computing system and to a blockchain system, a second request for identifying a blockchain containing a block containing a copy of the first data that is output by the first equipment; and
   in response to the blockchain system identifying the blockchain containing a copy of the first data that is output by the first equipment, performing the following:
   receiving, with the computing system, a copy of the identified blockchain from the blockchain system;
   abstracting, with the computing system and from the identified blockchain, the block containing the copy of the first data;
   abstracting, with the computing system and from the block, the copy of the first data that is output by the first equipment; and
   sending, with the computing system, the first data to the requesting device,
   wherein the determination that the first data as output by the first equipment being deemed to be trusted data is based on a determination that the first data as output by the first equipment is within a predetermined range of threshold values or parameters, wherein the determination that the first data is deemed to require further data validation is based on a determination that the first data exceeds the predetermined range of threshold values or parameters.

2. The method of claim 1, wherein the computing system comprises one of a data collection system, a real-time processing system, an artificial intelligence ("AI") system, a server computer, a cloud-based computing system over a network, or a distributed computing system.

3. The method of claim 1, wherein the requesting device comprises one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant.

4. The method of claim 1, wherein the first equipment is a physical device, wherein the first equipment comprises one of an optical network device, a router, a server, an Internet of Things ("IoT") sensor, an IoT actuator, or a customer interaction data collection system.

5. The method of claim 1, wherein the first equipment is a virtual device, wherein the first equipment comprises one of a virtual network device, a virtual router, a server, or a virtual customer interaction data collection system.

6. The method of claim 1, wherein analyzing the first data comprises analyzing, with the computing system, the first data in real-time or near-real-time.

7. The method of claim 1, further comprising:
   analyzing, with the computing system, the first data to predict equipment failure of the first equipment, based on analysis of the first data, wherein the first data comprises at least one of a status of the first equipment, a change in status of the first equipment, or one or more alerts output by the first equipment, wherein the first data further comprises at least one of a source identifier, a date and time stamp associated with each of at least one of the status of the first equipment, the change in status of the first equipment, or the one or more alerts output by the first equipment.

8. The method of claim 1, wherein the first data comprises at least one of one or more portions of a log of interactions between a user and a service provider, data communicated by third party service provider systems, data communicated by public service systems, or public data, wherein the interactions between the user and the service provider comprises at least one of online chats, text messages, telephone conversations, e-mail communications, software application usage, or service provider website interaction by the user, wherein the public data comprises at least one of weather data, stock data, news data, or street traffic data.

9. An apparatus, comprising:
   at least one processor; and
   a non-transitory computer readable medium communicatively coupled to the at least one processor, the non-transitory computer readable medium having stored thereon computer software comprising a set of instructions that, when executed by the at least one processor, causes the apparatus to:
   receive, from a requesting device, a first request for first data that is output by first equipment;
   in response to receiving the first request for the first data, retrieve the first data that is output by the first equipment;
   analyze the first data to determine whether the first data as output by the first equipment can be trusted;
   based on a determination that the first data as output by the first equipment is deemed to be trusted data, send the first data to the requesting device;
   based on a determination that the first data is deemed to require further data validation, send, to a blockchain system, a second request for identifying a blockchain containing a block containing a copy of the first data that is output by the first equipment; and
   in response to the blockchain system identifying the blockchain containing a copy of the first data that is output by the first equipment, perform the following:
   receiving a copy of the identified blockchain from the blockchain system;
   abstracting, from the identified blockchain, the block containing the copy of the first data;
   abstracting, from the block, the copy of the first data that is output by the first equipment; and
   sending the first data to the requesting device,
   wherein the determination that the first data as output by the first equipment being deemed to be trusted data is based on a determination that the first data as output by the first equipment is within a predetermined range of threshold values or parameters, wherein the determination that the first data is deemed to require further data validation is based on a determination that the first data exceeds the predetermined range of threshold values or parameters.

10. The apparatus of claim 9, wherein the apparatus comprises one of a data collection system, a real-time processing system, an artificial intelligence ("AI") system, a server computer, a cloud-based computing system over a network, or a distributed computing system.

11. The apparatus of claim 9, wherein the requesting device comprises one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant.

12. The apparatus of claim 9, wherein the set of instructions, when executed by the at least one processor, further causes the apparatus to:
   analyze the first data to predict equipment failure of the first equipment, based on analysis of the first data, wherein the first data comprises at least one of a status of the first equipment, a change in status of the first equipment, or one or more alerts output by the first equipment, wherein the first data further comprises at least one of a source identifier, a date and time stamp associated with each of at least one of the status of the first equipment, the change in status of the first equipment, or the one or more alerts output by the first equipment.

13. The apparatus of claim 9, wherein the first data comprises at least one of one or more portions of a log of interactions between a user and a service provider, data communicated by third party service provider systems, data communicated by public service systems, or public data, wherein the interactions between the user and the service provider comprises at least one of online chats, text messages, telephone conversations, e-mail communications, software application usage, or service provider website interaction by the user, wherein the public data comprises at least one of weather data, stock data, news data, or street traffic data.

14. A system, comprising:
   a computing system, comprising:
   at least one first processor; and
   a first non-transitory computer readable medium communicatively coupled to the at least one first processor, the first non-transitory computer readable medium having stored thereon computer software comprising a first set of instructions that, when executed by the at least one first processor, causes the computing system to:
   receive, from a requesting device, a first request for first data that is output by first equipment;
   in response to receiving the first request for the first data, retrieve the first data that is output by the first equipment;
   analyze the first data to determine whether the first data as output by the first equipment can be trusted;
   based on a determination that the first data as output by the first equipment is deemed to be trusted data, send the first data to the requesting device;
   based on a determination that the first data is deemed to require further data validation, send, to a blockchain system, a second request for identifying a blockchain containing a block containing a copy of the first data that is output by the first equipment; and
   in response to the blockchain system identifying the blockchain containing a copy of the first data that is output by the first equipment, perform the following:
   receiving a copy of the identified blockchain from the blockchain system;
   abstracting, from the identified blockchain, the block containing the copy of the first data;
   abstracting, from the block, the copy of the first data that is output by the first equipment; and
   sending the first data to the requesting device,
   wherein the determination that the first data as output by the first equipment being deemed to be trusted data is based on a determination that the first data as output by the first equipment is within a predetermined range of threshold values or parameters, wherein the determination that the first data is deemed to require further data validation is based on a determination that the first data exceeds the predetermined range of threshold values or parameters.

* * * * *